United States Patent
Egilmez et al.

(10) Patent No.: US 12,231,666 B2
(45) Date of Patent: Feb. 18, 2025

(54) FRONT-END ARCHITECTURE FOR NEURAL NETWORK BASED VIDEO CODING

(71) Applicant: QUALCOMM Incorporated, San Diego, CA (US)

(72) Inventors: Hilmi Enes Egilmez, San Diego, CA (US); Ankitesh Kumar Singh, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/643,383

(22) Filed: Dec. 8, 2021

(65) Prior Publication Data

US 2022/0191523 A1    Jun. 16, 2022

Related U.S. Application Data

(60) Provisional application No. 63/131,802, filed on Dec. 30, 2020, provisional application No. 63/124,016, filed on Dec. 10, 2020.

(51) Int. Cl.
*H04N 19/42*      (2014.01)
*G06N 3/048*      (2023.01)
(Continued)

(52) U.S. Cl.
CPC ............ *H04N 19/42* (2014.11); *G06N 3/048* (2023.01); *H04N 19/124* (2014.11);
(Continued)

(58) Field of Classification Search
CPC ...................................................... H04N 19/50
See application file for complete search history.

(56) References Cited

U.S. PATENT DOCUMENTS

2021/0368211 A1 *   11/2021   Wan ..................... H04N 19/117

OTHER PUBLICATIONS

Ye Y et al: "[DNNVC] AhG on deep neural networks based video coding", 20. JVET Meeting; Oct. 7, 2020-Oct. 16, 2020; Teleconference; (The Joint Video Exploration Team of ISO/IEC JTC1/SC29/WG11 and ITU-T SG. 16 ), No. JVET-T0121 Oct. 13, 2020 (Oct. 13, 2020), XP030293606, Retrieved from the Internet: URL:https://jvet-experts.*

(Continued)

*Primary Examiner* — Jerry T Jean Baptiste
(74) *Attorney, Agent, or Firm* — Polsinelli LLP

(57) ABSTRACT

Techniques are described herein for processing video data using a neural network system. For instance, a process can include generating, by a first convolutional layer of an encoder sub-network of the neural network system, output values associated with a luminance channel of a frame. The process can include generating, by a second convolutional layer of the encoder sub-network, output values associated with at least one chrominance channel of the frame. The process can include generating, by a third convolutional layer based on the output values associated with the luminance channel of the frame and the output values associated with the at least one chrominance channel of the frame, a combined representation of the frame. The process can further include generating encoded video data based on the combined representation of the frame.

60 Claims, 15 Drawing Sheets

(51) Int. Cl.
H04N 19/124 (2014.01)
H04N 19/172 (2014.01)
H04N 19/186 (2014.01)
H04N 19/91 (2014.01)
G06N 3/045 (2023.01)

(52) U.S. Cl.
CPC ......... H04N 19/172 (2014.11); H04N 19/186 (2014.11); H04N 19/91 (2014.11); *G06N 3/045* (2023.01); *G06T 2207/10016* (2013.01); *G06T 2207/20084* (2013.01)

(56) References Cited

OTHER PUBLICATIONS

Egilmez (Qualcomm) H.E., et al., "A DNN Architecture for Intra-Frame Coding in YUV 4:2:0 Format with Cross-Component Prediction", 21.JVET Meeting, Jan. 6, 2021-Jan. 15, 2021, Teleconference, (The Joint Video Exploration Team of ISO/IEC JTC1/SC29/WG11 and ITU-T SG.16 ), No. JVET-U0079, Jan. 7, 2021 (Jan. 7, 2021), XP030293187, 8 Pages, Retrieved from the Internet: URL: https://jvet-experts.org/doc_end_user/documents/21_Teleconference/wg11/JVET-U0079-v2.zip JVET-U0079-v2.docx [Retrieved on Jan. 7, 2021] the Whole Document.

International Search Report and Written Opinion—PCT/US2021/072824—ISA/EPO—Feb. 23, 2022.

Jankowski M., et al., "Joint Device-Edge Inference over Wireless Links with Pruning", arxiv.org, Cornell University Library, 201 OLIN Library Cornell University Ithaca, NY 14853, Oct. 20, 2020 (Oct. 20, 2020), XP081789290, 10 Pages, DOI: 10.1109/SPAWC48557.2020.9154306, Abstract section "1 Introduction" section "2 Methods", subsections "2 Methods", subsections "2. 2 Classification baseline" and "2.3 Autoencoder architecture".

Alshina (Huawei) E., et al., "Exploration Experiments on Neural Network-based Video Coding (EE1)", 136. MPEG Meeting, Oct. 11, 2021-Oct. 15, 2021, Online, (Motion Picture Expert Group or Iso/Iec JTC1/SC29/WG11), No. M58401, JVET-X2023, Nov. 2, 2021, XP030299251, 10 Pages, section "2.4 JVET-X0081 EE1-Related: CNN-based Super Resolution for Video Coding Using Separate Networks for Chroma Components [C. Lin, Y. Li, K. Zhang, L.Zhang (Bytedance)]".

Ye Y., et al., "[DNNVC] AhG on Deep Neural Networks Based Video Coding", 20, JVET Meeting, Oct. 7, 2020-Oct. 16, 2020, Teleconference, (The Joint Video Exploration Team of ISO/IEC JTC1/SC29/WG11 and ITU-T SG.16), No. JVET-T0121, Oct. 13, 2020, XP030293606, 7 Pages, section m55267 [DNNVC] A Study of Handling YUV420 Input Format for DNN-Based Video Coding [Ankitesh K. Singh, Hilmi E. Egilmez, Muhammed Coban, Marta Karczewicz (Qualcomm)].

* cited by examiner

FRONT-END ARCHITECTURE FOR NEURAL NETWORK BASED VIDEO CODING

CROSS-REFERENCE TO RELATED APPLICATIONS

This application claims the benefit of U.S. Provisional Application No. 63/124,016, filed Dec. 10, 2020, and also the benefit of U.S. Provisional Application No. 63/131,802, filed Dec. 30, 2020, both of which are hereby incorporated by reference, in their entirety and for all purposes.

FIELD OF THE DISCLOSURE

The present disclosure generally relates to image and video coding, including encoding (or compression) and decoding (decompression) of images and/or video. For example, aspects of the present disclosure relate to techniques for handling luminance-chrominance (YUV) input formats (e.g., 4:2:0 YUV input format, 4:4:4 YUV input format, 4:2:2 YUV input format, etc.) and/or other input formats using an end-to-end machine learning (e.g., neural network)-based image and video coding system.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content using one or more machine learning systems. For example, an end-to-end machine learning (e.g., neural network)-based image and video coding (E2E-NNVC) system is provided that can process YUV (digital domain YCbCr) input formats (and in some cases other input formats), in some cases specifically 4:2:0 YUV input formats. The E2E-NNVC system can process stand-alone frames (also referred to as images or pictures) and/or video data that includes multiple frames. The YUV format includes a luminance channel (Y) and a pair of chrominance channels (U and V). The U and V channels can be subsampled with respect to the Y channel without a significant or noticeable impact on visual quality. The correlation across channels is reduced in the YUV format, which may not be the case with other color formats (e.g., the red-green-blue (RGB) format). Aspects of the systems and techniques described herein provide a front-end architecture (e.g., a new subnetwork) to accommodate the YUV 4:2:0 input format (and in some cases other input formats) in E2E-NNVCs that are designed for the RGB input format (and in some cases E2E-NNVCs designed for other input formats). The front-end architecture is applicable to many E2E-NNVC architectures.

In one illustrative example, a method of processing video data is provided. The method includes: generating, by a first convolutional layer of an encoder sub-network of a neural network system, output values associated with a luminance channel of a frame; generating, by a second convolutional layer of the encoder sub-network, output values associated with at least one chrominance channel of the frame; generating, by a third convolutional layer based on the output values associated with the luminance channel of the frame and the output values associated with the at least one chrominance channel of the frame, a combined representation of the frame; and generating encoded video data based on the combined representation of the frame.

In another example, an apparatus for processing video data is provided that includes a memory and a processor (e.g., implemented in circuitry) coupled to the memory. In some examples, more than one processor can be coupled to the memory and can be used to perform one or more of the operations. The processor is configured to: generate, using a first convolutional layer of an encoder sub-network of a neural network system, output values associated with a luminance channel of a frame; generate, using a second convolutional layer of the encoder sub-network, output values associated with at least one chrominance channel of the frame; generate, using a third convolutional layer based on the output values associated with the luminance channel of the frame and the output values associated with the at least one chrominance channel of the frame, a combined representation of the frame; and generate encoded video data based on the combined representation of the frame.

In another example, a non-transitory computer-readable medium is provided for encoding video data, which has stored thereon instructions that, when executed by one or more processors, cause the one or more processor to: generate, using a first convolutional layer of an encoder sub-network of a neural network system, output values associated with a luminance channel of a frame; generate, using a second convolutional layer of the encoder sub-network, output values associated with at least one chrominance channel of the frame; generate, using a third convolutional layer based on the output values associated with the luminance channel of the frame and the output values associated with the at least one chrominance channel of the frame, a combined representation of the frame; and generate encoded video data based on the combined representation of the frame.

In another example, an apparatus for processing video data is provided. The apparatus includes: means for generating, by a first convolutional layer of an encoder sub-network of a neural network system, output values associated with a luminance channel of a frame; means for generating, by a second convolutional layer of the encoder sub-network, output values associated with at least one chrominance channel of the frame; means for generating, by a third convolutional layer based on the output values associated with the luminance channel of the frame and the output values associated with the at least one chrominance channel of the frame, a combined representation of the frame; and means for generating encoded video data based on the combined representation of the frame.

In some aspects, the third convolutional layer includes a 1×1 convolutional layer. The 1×1 convolutional layer includes one or more 1×1 convolutional filters.

In some aspects, the methods, apparatuses, and computer-readable medium described above for processing video data further comprise: processing, using a first non-linear layer of the encoder sub-network, the output values associated with the luminance channel of the frame; and processing, using a second non-linear layer of the encoder sub-network, the output values associated with the at least one chrominance channel of the frame. In such aspects, the combined representation is generated based on an output of the first non-linear layer and an output of the second non-linear layer.

In some aspects, the combined representation of the frame is generated by the third convolutional layer using the output of the first non-linear layer and the output of the second non-linear layer as input.

In some aspects, the methods, apparatuses, and computer-readable medium described above for processing video data further comprise quantizing the encoded video data.

In some aspects, the methods, apparatuses, and computer-readable medium described above for processing video data further comprise entropy coding the encoded video data.

In some aspects, the methods, apparatuses, and computer-readable medium described above for processing video data further comprise storing the encoded video data in memory.

In some aspects, the methods, apparatuses, and computer-readable medium described above for processing video data further comprise transmitting the encoded video data over a transmission medium to at least one device.

In some aspects, the methods, apparatuses, and computer-readable medium described above for processing video data further comprise: obtaining an encoded frame; generating, by a first convolutional layer of a decoder sub-network of the neural network system, reconstructed output values associated with a luminance channel of the encoded frame; and generating, by a second convolutional layer of the decoder sub-network, reconstructed output values associated with at least one chrominance channel of the encoded frame.

In some aspects, the methods, apparatuses, and computer-readable medium described above for processing video data further comprise separating, using a third convolutional layer of the decoder sub-network, the luminance channel of the encoded frame from the at least one chrominance channel of the encoded frame.

In some aspects, the third convolutional layer of the decoder sub-network includes a 1×1 convolutional layer. The 1×1 convolutional layer includes one or more 1×1 convolutional filters.

In some aspects, the frame includes a video frame. In some aspects, the at least one chrominance channel includes a chrominance-blue channel and a chrominance-red channel. In some aspects, the frame has a luminance-chrominance (YUV) format.

In one illustrative example, a method of processing video data is provided. The method includes: obtaining an encoded frame; separating, by a first convolutional layer of the decoder sub-network, a luminance channel of the encoded frame from at least one chrominance channel of the encoded frame; generating, by a second convolutional layer of a decoder sub-network of a neural network system, reconstructed output values associated with the luminance channel of the encoded frame; generating, by a third convolutional layer of the decoder sub-network, reconstructed output values associated with the at least one chrominance channel of the encoded frame; and generating an output frame including the reconstructed output values associated with the luminance channel and the reconstructed output values associated with the at least one chrominance channel.

In another example, an apparatus for processing video data is provided that includes a memory and a processor (e.g., implemented in circuitry) coupled to the memory. In some examples, more than one processor can be coupled to the memory and can be used to perform one or more of the operations. The processor is configured to: obtain an encoded frame; separate, using a first convolutional layer of the decoder sub-network, a luminance channel of the encoded frame from at least one chrominance channel of the encoded frame; generate, using a second convolutional layer of a decoder sub-network of a neural network system, reconstructed output values associated with the luminance channel of the encoded frame; generate, using a third convolutional layer of the decoder sub-network, reconstructed output values associated with the at least one chrominance channel of the encoded frame; and generate an output frame including the reconstructed output values associated with the luminance channel and the reconstructed output values associated with the at least one chrominance channel.

In another example, a non-transitory computer-readable medium is provided for encoding video data, which has stored thereon instructions that, when executed by one or more processors, cause the one or more processor to: obtain an encoded frame; separate, using a first convolutional layer of the decoder sub-network, a luminance channel of the encoded frame from at least one chrominance channel of the encoded frame; generate, using a second convolutional layer of a decoder sub-network of a neural network system, reconstructed output values associated with the luminance channel of the encoded frame; generate, using a third convolutional layer of the decoder sub-network, reconstructed output values associated with the at least one chrominance channel of the encoded frame; and generate an output frame including the reconstructed output values associated with the luminance channel and the reconstructed output values associated with the at least one chrominance channel.

In another example, an apparatus for processing video data is provided. The apparatus includes: means for obtaining an encoded frame; means for separating, by a first convolutional layer of the decoder sub-network, a luminance channel of the encoded frame from at least one chrominance channel of the encoded frame; means for generating, by a second convolutional layer of a decoder sub-network of a neural network system, reconstructed output values associated with the luminance channel of the encoded frame; means for generating, by a third convolutional layer of the decoder sub-network, reconstructed output values associated with the at least one chrominance channel of the encoded frame; and means for generating an output frame including the reconstructed output values associated with the luminance channel and the reconstructed output values associated with the at least one chrominance channel.

In some aspects, the first convolutional layer of the decoder sub-network includes a 1×1 convolutional layer. The 1×1 convolutional layer includes one or more 1×1 convolutional filters.

In some aspects, the methods, apparatuses, and computer-readable medium described above for processing video data further comprise: processing, using a first non-linear layer of the decoder sub-network, values associated with the luminance channel of the encoded frame, wherein the reconstructed output values associated with the luminance channel are generated based on an output of the first non-linear layer; and processing, using a second non-linear layer of the decoder sub-network, values associated with the at least one chrominance channel of the encoded frame, wherein the reconstructed output values associated with the at least one chrominance channel are generated based on an output of the second non-linear layer.

In some aspects, the methods, apparatuses, and computer-readable medium described above for processing video data further comprise dequantizing samples of the encoded frame.

In some aspects, the methods, apparatuses, and computer-readable medium described above for processing video data further comprise entropy decoding samples of the encoded frame.

In some aspects, the methods, apparatuses, and computer-readable medium described above for processing video data further comprise storing the output frame in memory.

In some aspects, the methods, apparatuses, and computer-readable medium described above for processing video data further comprise displaying the output frame.

In some aspects, the methods, apparatuses, and computer-readable medium described above for processing video data further comprise: generating, by a first convolutional layer of an encoder sub-network of the neural network system, output values associated with a luminance channel of a frame; generating, by a second convolutional layer of the encoder sub-network, output values associated with at least one chrominance channel of the frame; generating, by a third convolutional layer of the encoder sub-network based on the output values associated with the luminance channel of the frame and the output values associated with the at least one chrominance channel of the frame, a combined representation of the frame; and generating the encoded frame based on the combined representation of the frame.

In some aspects, the third convolutional layer of the encoder sub-network includes a 1×1 convolutional layer. The 1×1 convolutional layer includes one or more 1×1 convolutional filters.

In some aspects, the methods, apparatuses, and computer-readable medium described above for processing video data further comprise: processing, using a first non-linear layer of the encoder sub-network, the output values associated with the luminance channel of the frame; and processing, using a second non-linear layer of the encoder sub-network, the output values associated with the at least one chrominance channel of the frame; wherein the combined representation is generated based on an output of the first non-linear layer and an output of the second non-linear layer.

In some aspects, the combined representation of the frame is generated by the third convolutional layer of the encoder sub-network using the output of the first non-linear layer and the output of the second non-linear layer as input.

In some aspects, the encoded frame includes an encoded video frame.

In some aspects, the at least one chrominance channel includes a chrominance-blue channel and a chrominance-red channel.

In some aspects, the encoded frame has a luminance-chrominance (YUV) format.

In some aspects, the apparatus can be or can be part of a mobile device (e.g., a mobile telephone or so-called "smart phone", a tablet computer, or other type of mobile device), a network-connected wearable device, an extended reality device (e.g., a virtual reality (VR) device, an augmented reality (AR) device, or a mixed reality (MR) device), a personal computer, a laptop computer, a server computer (e.g., a video server or other server device), a television, a vehicle (or a computing device or system of a vehicle), a camera (e.g., a digital camera, an Internet Protocol (IP) camera, etc.), a multi-camera system, a robotics device or system, an aviation device or system, or other device. In some aspects, the apparatus includes at least one camera for capturing one or more images or video frames (or pictures). For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the apparatuses described above can include one or more sensors. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
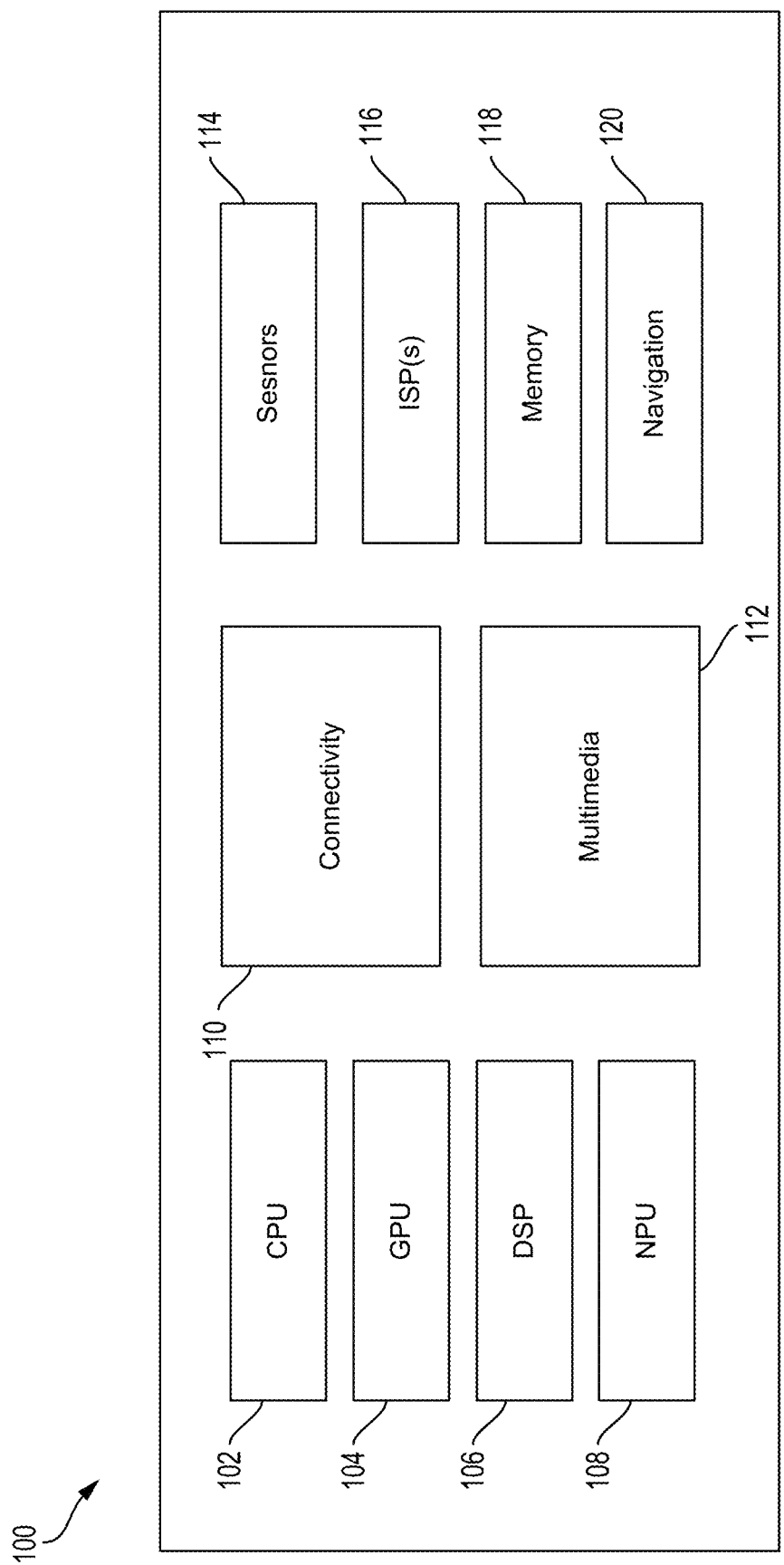
FIG. 1 illustrates an example implementation of a system-on-a-chip (SOC)

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding standard. Example video coding standards include high-efficiency video coding (HEVC), advanced video coding (AVC), moving picture experts group (MPEG) coding, and versatile video coding (VVC). Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Systems, apparatuses, processes (also referred to as methods), and computer-readable media (collectively referred to as "systems and techniques") are described herein for performing image and/or video coding using one or more machine learning (ML) systems. In general, ML is a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. CNNs, for example, may be trained to recognize a hierarchy of features. Computation in CNN architectures may be distributed over a population of processing nodes, which may be configured in one or more computational chains. These multi-layered architectures may be trained one layer at a time and may be fine-tuned using back propagation.

In some aspects, the systems and techniques described herein include an end-to-end ML-based (e.g., using a neural network architecture) image and video coding (E2E-NNVC) system designed for processing input data that has luminance-chrominance (YUV) input formats. The YUV format includes a luminance channel (Y) and a pair of chrominance channels (U and V). The U channel can be referred to as the chrominance (or chroma)-blue channel and the V channel can be referred to as the chrominance (or chroma)-red channel. In some cases, the luminance (Y) channel or component can also be referred to as the luma channel or component. In some cases, the chrominance (U and V) channels or components can also be referred to as the chroma channels or components. YUV input formats can include YUV 4:2:0, YUV 4:4:4, YUV 4:2:2, among others. In some cases, the systems and techniques described herein can be designed to handle other input formats, such as data having a Y-Chroma Blue (Cb)-Chroma Red (Cr) (YCbCr) format, a red-green-blue (RGB) format, and/or other format. The E2E-NNVC systems described herein can encode and/or decode stand-alone frames (also referred to as images or pictures) and/or video data that includes multiple frames.

In many cases, E2E-NNVC systems are designed as combination of an autoencoder sub-network (the encoder sub-network) and a second sub-network (also referred to in some cases as a hyperprior network) responsible for learning a probabilistic model over quantized latents used for entropy coding (a decoder sub-network). In some cases, there can be other sub-networks of the decoder. Such an E2E-NNVC system architecture can be viewed as a combination of a transform plus quantization module (or encoder sub-network) and the entropy modelling sub-network module.

Most E2E-NNVC system architectures are designed to operate in non-subsampled input formats, such as RGB, YUV 4:4:4, or other non-subsampled input format. However, video coding standards, such as HEVC and VVC, are designed to support the YUV 4:2:0 color format in their respective main profiles. To support 4:2:0 YUV format, E2E-NNVC architectures that are designed to operate in non-subsampled input formats have to be modified.

The systems and techniques described herein provide a front-end architecture (e.g., a subnetwork) for handling one or more particular color formats (e.g., the YUV 4:2:0 color format) that is applicable to existing E2E-NNVC architectures. The systems and techniques consider different characteristics of Y and UV channels, as well as the difference in resolution. For example, the Y and UV channels of a frame or portion of a frame can be input to two separate neural network layers of an encoder sub-network of a neural network system. In some examples, the two neural network layers include convolutional layers. In some aspects, the outputs of the two separate neural network layers are processed by a pair of non-linear layers or operators of the encoder sub-network. The pair of non-linear layers or operators can include generalized divisive normalization (GDN) layers or operators, parametric rectified linear unit (PReLU) layers or operators, and/or other non-linear layers or operators. The outputs of the two separate neural network layers (or the outputs of the non-linear layers or operators) are combined using an additional neural network layer of the encoder sub-network.

In some examples, the additional neural network layer is a 1×1 convolutional layer. The 1×1 convolutional layer performs a per-pixel or per-value cross-channel mixing (e.g., by generating a linear combination) of the Y and UV components, resulting in a cross-component (e.g., cross-luminance and chrominance component) prediction that improves coding performance. For example, the cross-channel mixing of the Y and UV components decorrelates the Y component from the U and V components, which results in improved coding performance (e.g., increased coding efficiency). In some cases, the 1×1 convolutional layer can include N 1×1 convolutional filters (where N is equal to an integer value corresponding to the number of channels input to the 1×1 convolutional layer). Each 1×1 convolutional filter has a respective scaling factor that is applied to a corresponding Nth channel of the Y component and a corresponding Nth channel of the UV components.

The output of the additional neural network layer (e.g., the 1×1 convolutional layer) can be processed by one or more non-linear layers and/or one or more further neural network layers (e.g., convolutional layer(s)) of the encoder sub-network. A quantization engine can perform quantization on the features output by a final neural network layer of the encoder sub-network to generate a quantized output. An entropy encoding engine can entropy encode the quantized output from the quantization engine to generate a bitstream. The neural network system can output the bitstream for storage, for transmission to another device, to a server device or system, etc.

A decoder sub-network of the neural network system or a decoder sub-network of another neural network system (of another device) can decode the bitstream. For example, an entropy decoding engine of the decoder sub-network can entropy decode the bitstream and output the entropy decoded data to a dequantization engine. The dequantization engine can dequantize the data. The dequantized data can be processed by one or more neural network layers (e.g., convolutional layer(s)) and/or one or more inverse non-linear layers of the decoder sub-network. For instance, after being processed by one or more convolutional layers and one or more inverse non-linear layers, a 1×1 convolutional layer can process the data. The 1×1 convolutional layer can divide the data into Y channel features and combined UV channel features. The Y channel features and the combined UV channel features can be processed by two final neural network layers (e.g., two convolutional layers) and in some cases two final inverse non-linear layers. For instance, a first final neural network layer can process the Y channel features and output a reconstructed Y channel per pixel or sample of a reconstructed frame (e.g., luminance samples or pixels). A second final neural network layer can process the combined UV channel features, and can output a reconstructed U channel per pixel or sample of the reconstructed frame (e.g., chrominance-blue samples or pixels) and a reconstructed V channel per pixel or sample of the reconstructed frame (e.g., chrominance-red samples or pixels).

Further details regarding the systems and techniques will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using machine learning techniques according to aspects of the present disclosure discussed herein. By using deep learning architectures to perform video compression and/or decompression, aspects of the present disclosure can increase the efficiency of video compression and/or decompression on a device. For example, a device using the video coding techniques described can compress video more efficiently using the machine learning based techniques, can transmit the compressed video to another device, and the other device can decompress the compressed video more efficiently using the machine learning based techniques described herein.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
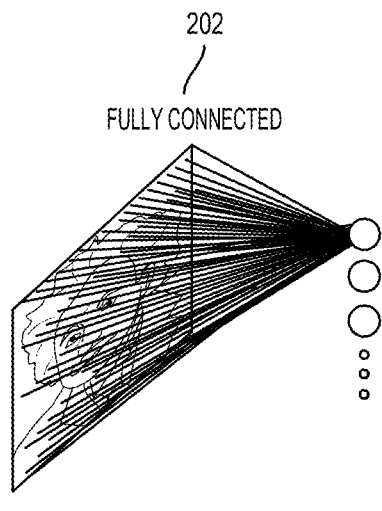
FIG. 2A illustrates an example of a fully connected neural network.
Figure 2B:
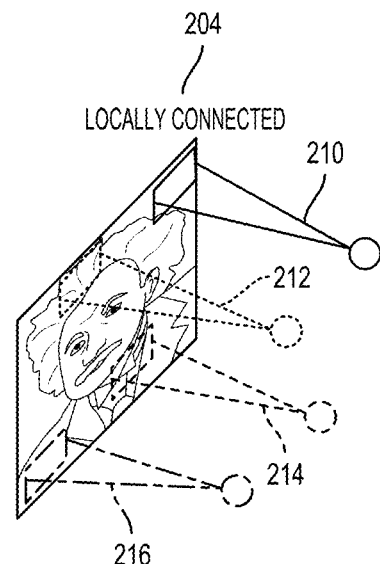
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
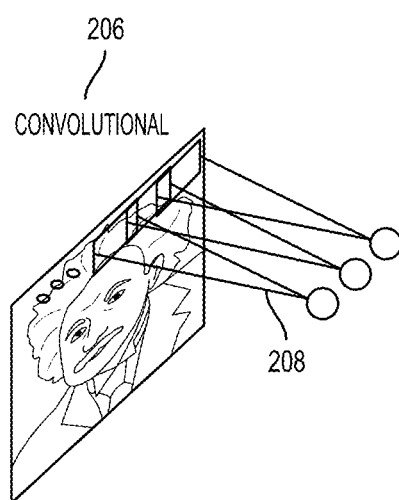
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
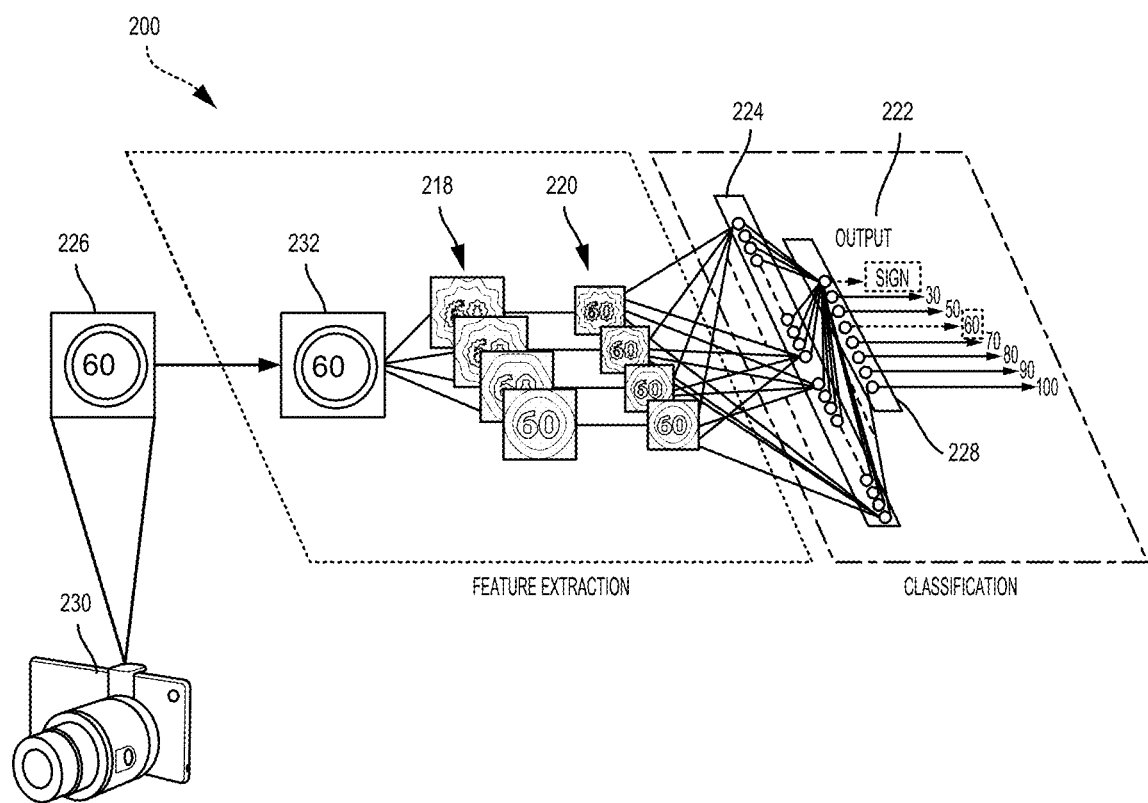
FIG. 2D illustrates a detailed example of a deep convolutional network (DCN) designed to recognize visual features from an image.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and non-linear (e.g., normalization) layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
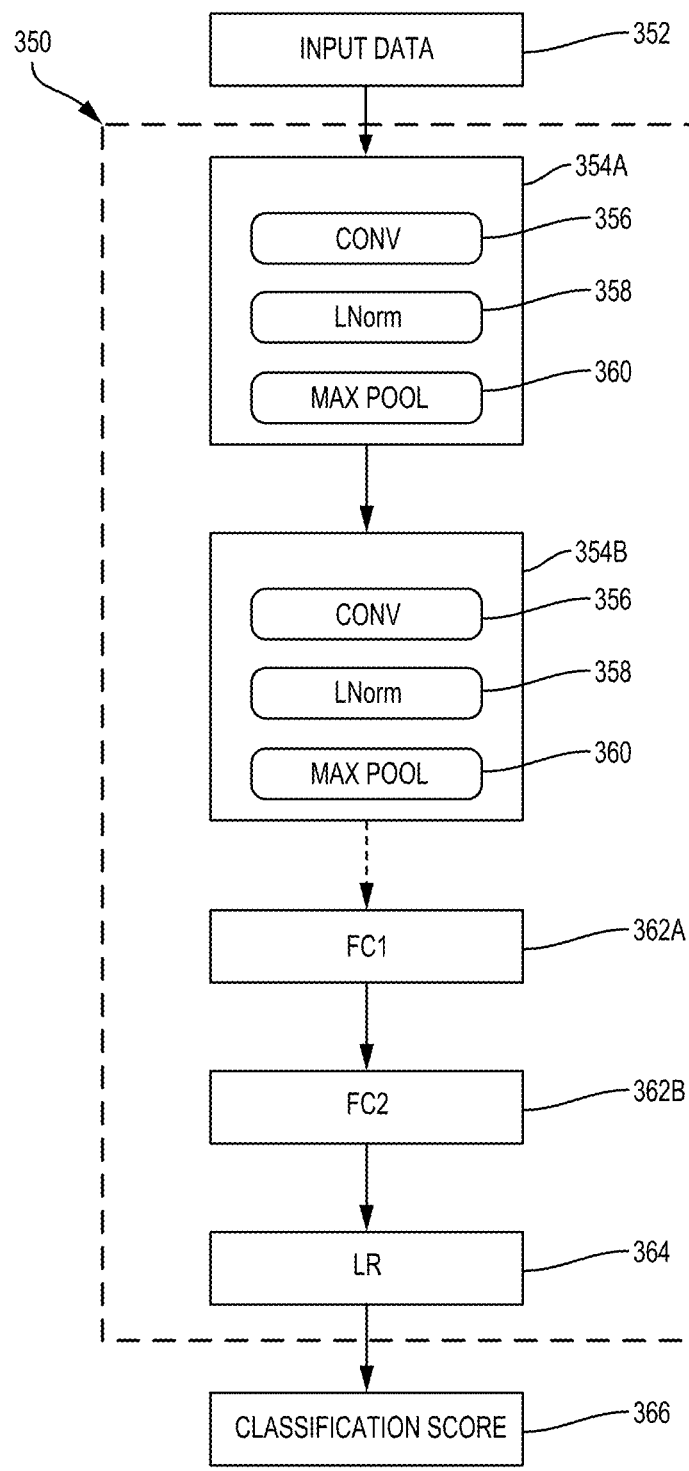
FIG. 3 is a block diagram illustrating a deep convolutional network (DCN)

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B, 364 of the deep convolutional network 350 are weights (not shown) that are to be updated. The output of each of the layers (e.g., 356, 358, 360, 362A, 362B, 364) may serve as an input of a succeeding one of the layers (e.g., 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As noted above, digital video data can include large amounts of data, which can place a significant burden on communication networks as well as on devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Despite advances in the amount of available bandwidth in wireless networks, it may still be desirable to reduce the amount of bandwidth used to deliver video content in these networks.

Because uncompressed video content can result in large files that may involve sizable memory for physical storage and considerable bandwidth for transmission, video coding techniques can be utilized to compress and then decompress such video content.

To reduce the size of video content—and thus the amount of storage involved to store video content—and the amount of bandwidth involved in delivering video content, various video coding techniques can be performed according to a particular video coding Standard, such as HEVC, AVC, MPEG, VVC, among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

In general, an encoding device encodes video data according to a video coding Standard to generate an encoded video bitstream. In some examples, an encoded video bitstream (or "video bitstream" or "bitstream") is a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

After performing prediction using intra- and/or inter-prediction, the encoding device can perform transformation and quantization. For example, following prediction, the encoding device may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding Standards (e.g., the HEVC video coding techniques described above) may be able to retain much of the information in raw video content and may be defined a priori based on signal processing and information theory concepts. However, in some cases, a machine learning (ML)-based image and/or video system can provide benefits over non-ML based image and video coding systems, such as an end-to-end neural network-based image and video coding (E2E-NNVC) system. As described above, many E2E-NNVC systems are designed as combination of an autoencoder sub-network (the encoder sub-network) and a second sub-network responsible for learning a probabilistic model over quantized latents used for entropy coding. Such an architecture can be viewed as a combination of a transform plus quantization module (encoder sub-network) and the entropy modelling sub-network module.

Figure 4:
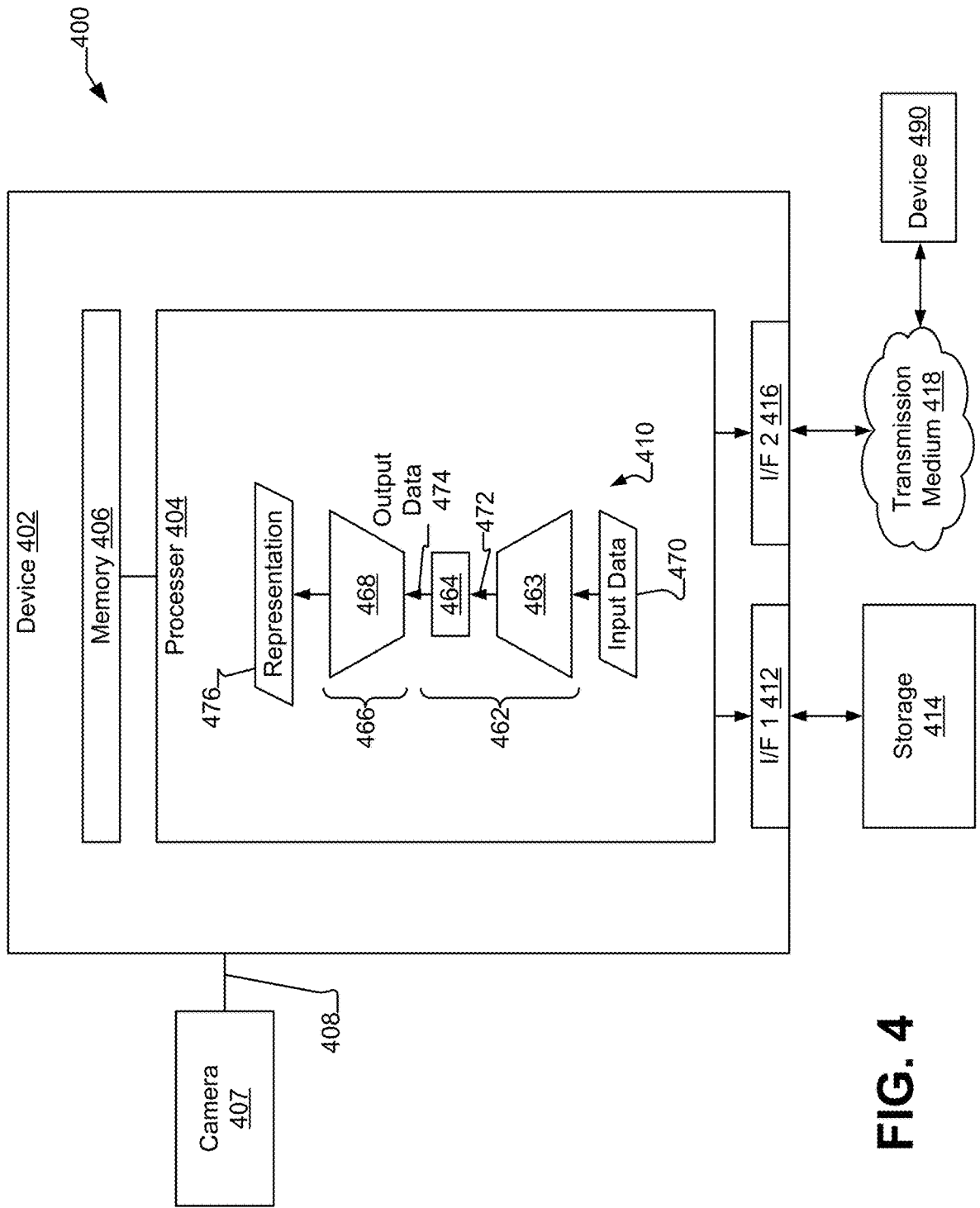
FIG. 4 is a diagram illustrating an example of a system including a device operable to perform image and/or video coding (encoding and decoding) using a neural network-based system, in accordance with some examples.

FIG. 4 depicts a system 400 that includes a device 402 configured to perform video encoding and decoding using an E2E-NNVC system 410. The device 402 is coupled to a camera 407 and a storage medium 414 (e.g., a data storage device). In some implementations, the camera 407 is configured to provide the image data 408 (e.g., a video data stream) to the processor 404 for encoding by the E2E-

NNVC system 410. In some implementations, the device 402 can be coupled to and/or can include multiple cameras (e.g., a dual-camera system, three cameras, or other number of cameras). In some cases, the device 402 can be coupled to a microphone and/or other input device (e.g., a keyboard, a mouse, a touch input device such as a touchscreen and/or touchpad, and/or other input device). In some examples, the camera 407, the storage medium 414, microphone, and/or other input device can be part of the device 402.

The device 402 is also coupled to a second device 490 via a transmission medium 418, such as one or more wireless networks, one or more wired networks, or a combination thereof. For example, the transmission medium 418 can include a channel provided by a wireless network, a wired network, or a combination of a wired and wireless network. The transmission medium 418 may form part of a packet-based network, such as a local area network, a wide-area network, or a global network such as the Internet. The transmission medium 418 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 402 includes one or more processors (referred to herein as "processor") 404 coupled to a memory 406, a first interface ("I/F 1") 412, and a second interface ("I/F 2") 416. The processor 404 is configured to receive image data 408 from the camera 407, from the memory 406, and/or from the storage medium 414. The processor 404 is coupled to the storage medium 414 via the first interface 412 (e.g., via a memory bus) and is coupled to the transmission medium 418 via the second interface 416 (e.g., a network interface device, a wireless transceiver and antenna, one or more other network interface devices, or a combination thereof).

The processor 404 includes the E2E-NNVC system 410. The E2E-NNVC system 410 includes an encoder portion 462 and a decoder portion 466. In some implementations, the E2E-NNVC system 410 can include one or more auto-encoders. The encoder portion 462 is configured to receive input data 470 and to process the input data 470 to generate output data 474 at least partially based on the input data 470.

In some implementations, the encoder portion 462 of the E2E-NNVC system 410 is configured to perform lossy compression of the input data 470 to generate the output data 474, so that the output data 474 has fewer bits than the input data 470. The encoder portion 462 can be trained to compress input data 470 (e.g., images or video frames) without using motion compensation based on any previous representations (e.g., one or more previously reconstructed frames). For example, the encoder portion 462 can compress a video frame using video data only from that video frame, and without using any data of previously reconstructed frames. Video frames processed by the encoder portion 462 can be referred to herein as intra-predicted frame (I-frames). In some examples, I-frames can be generated using traditional video coding techniques (e.g., according to HEVC, VVC, MPEG-4, or other video coding Standard). In such examples, the processor 404 may include or be coupled with a video coding device (e.g., an encoding device) configured to perform block-based intra-prediction, such as that described above with respect to the HEVC Standard. In such examples, the E2E-NNVC system 410 may be excluded from the processor 404.

In some implementations, the encoder portion 462 of the E2E-NNVC system 410 can be trained to compress input data 470 (e.g., video frames) using motion compensation based on previous representations (e.g., one or more previously reconstructed frames). For example, the encoder portion 462 can compress a video frame using video data from that video frame and using data of previously reconstructed frames. Video frames processed by the encoder portion 462 can be referred to herein as intra-predicted frame (P-frames). The motion compensation can be used to determine the data of a current frame by describing how the pixels from a previously reconstructed frame move into new positions in the current frame along with residual information.

As shown, the encoder portion 462 of the E2E-NNVC system 410 can include a neural network 463 and a quantizer 464. The neural network 463 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 472. The intermediate data 472 is input to the quantizer 464. Examples of components that may be included in the encoder portion 462 are illustrated in FIG. 6A-FIG. 6E.

The quantizer 464 is configured to perform quantization and in some cases entropy coding of the intermediate data 472 to produce the output data 474. The output data 474 can include the quantized (and in some cases entropy coded) data. The quantization operations performed by the quantizer 464 can result in the generation of quantized codes (or data representing quantized codes generated by the E2E-NNVC system 410) from the intermediate data 472. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the E2E-NNVC system 410. In one illustrative example, the E2E-NNVC system 410 can be trained using supervised training, with residual data being used as input and quantized codes and entropy codes being used as known output (labels) during the training.

The decoder portion 466 of the E2E-NNVC system 410 is configured to receive the output data 474 (e.g., directly from quantizer 464 and/or from the storage medium 414). The decoder portion 466 can process the output data 474 to generate a representation 476 of the input data 470 at least partially based on the output data 474. In some examples, the decoder portion 466 of the E2E-NNVC system 410 includes a neural network 468 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures. Examples of components that may be included in the decoder portion 466 are illustrated in FIG. 6A-FIG. 6E.

The processor 404 is configured to send the output data 474 to at least one of the transmission medium 418 or the storage medium 414. For example, the output data 474 may be stored at the storage medium 414 for later retrieval and decoding (or decompression) by the decoder portion 466 to generate the representation 476 of the input data 470 as reconstructed data. The reconstructed data can be used for various purposes, such as for playback of video data that has been encoded/compressed to generate the output data 474. In some implementations, the output data 474 may be decoded at another decoder device that matches the decoder portion 466 (e.g., in the device 402, in the second device 490, or in another device) to generate the representation 476 of the input data 470 as reconstructed data. For instance, the second device 490 may include a decoder that matches (or substantially matches) the decoder portion 466, and the output data 474 may be transmitted via the transmission medium 418 to the second device 490. The second device 490 can process the output data 474 to generate the representation 476 of the input data 470 as reconstructed data.

The components of the system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 400 is shown to include certain components, one of ordinary skill will appreciate that the system 400 can include more or fewer components than those shown in FIG. 4. For example, the system 400 can also include, or can be part of a computing device that includes, an input device and an output device (not shown). In some implementations, the system 400 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 4.

In some implementations, the system 400 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the E2E-NNVC system 410 can be incorporated into a portable electronic device that includes the memory 406 coupled to the processor 404 and configured to store instructions executable by the processor 404, and a wireless transceiver coupled to an antenna and to the processor 404 and operable to transmit the output data 474 to a remote device.

E2E-NNVC systems are typically designed to process RGB input. Examples of image and video coding schemes targeting RGB input are described in J. Balle, D. Minnen, S. Singh, S. J. Hwang, N. Johnston, "Variational image compression with a scale hyperprior", ICLR, 2018 (referred to as the "J. Balle Paper") and D. Minnen, J. Balle, G. Toderici, "Joint Autoregressive and Hierarchical Priors for Learned Image Compression", CVPR 2018 (referred to as the "D. Minnen Paper"), which are hereby incorporated by reference in their entirety and for all purposes.

Figure 5:
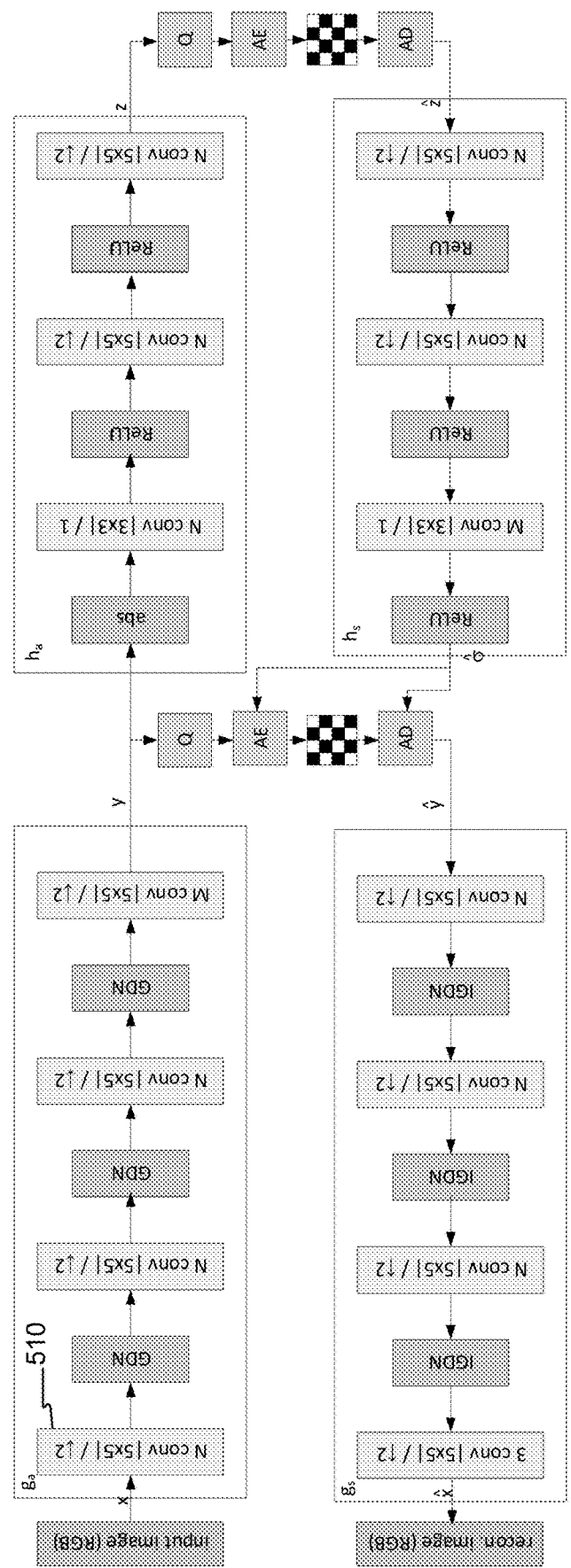
FIG. 5 is a diagram illustrating an example of an end-to-end neural network based image and video coding system for input having a red-green-blue (RGB) format, in accordance with some examples.

FIG. 5 is a diagram illustrating an example of the E2E-NNVC system described in the J. Balle Paper. The $g_a$ and $g_s$ sub-networks in the E2E-NNVC system of FIG. 5 correspond to the encoder sub-network (e.g., the encoder portion 462) and the decoder sub-network (e.g., the decoder portion 466), respectively. The $g_a$ and $g_s$ sub-networks of FIG. 5 are designed for three-channel RGB input, where all three R, G, and B input channels go through and are processed by the same neural network layers (the convolutional layers and generalized divisive normalization (GDN) layers). The neural network layers can include convolutional layers that perform convolutional operations and GDN and/or inverse-GDN (IGDN) nonlinearity layers that implement local divisive normalization. Local divisive normalization is a type of transformation that has been shown to be particularly suitable for density modelling and compression of images. E2E-NNVC systems (such as that shown in FIG. 5) target input channels with similar statistical characteristic, such as RGB data (where statistical properties of the different R, G, and B channels are similar).

While E2E-NNVC systems are typically designed to process RGB input, most image and video coding systems use YUV input formats (e.g., in many cases the YUV420 input format). The chrominance (U and V) channels of data in the YUV format can be subsampled with respect to the luminance (Y) channel. The subsampling results in a minimal impact on visual quality (e.g., there is no significant or noticeable impact on visual quality). Subsampled formats include the YUV420 format, the YUV422 format, and/or other YUV formats. The correlation across channels is reduced in the YUV format, which may not be the case with other color formats (e.g., the RGB format). Further, the statistics of the luminance (Y) and chrominance (U and V) channels are different. For instance, the U and V channels having smaller variance as compared to the luminance channel, whereas in the RGB formats for example, the statistical properties of the different R, G, and B channels are more similar. Video coders-decoders (or CODECs) are designed according to the input characteristics of data (e.g., a CODEC can encode and/or decode data according to the input format of the data. For example, if the chrominance channels of a frame are subsampled (e.g., the chrominance channels are half the resolution as compared to the luminance channel), then when a CODEC predicts a block of the frame for motion compensation, the luminance block would be twice as large for both width and height as compared to the chrominance blocks. In another example, the CODEC can determine how many pixels are going to be encoded or decode for chrominance and luminance, among others.

If RGB input data (which, as noted above, most E2E-NNVC systems are designed to process) is replaced with YUV 4:4:4 input data (where all channels have the same dimension), the performance of the E2E-NNVC system processing the input data is reduced due to different statistical characteristics of the luminance (Y) and chrominance (U and V) channels. As noted above, the chrominance (U and V) channels are subsampled in some YUV formats, such as in the case of YUV420. For instance, for content having the YUV 4:2:0 format, the U and V channel resolution is half of the Y channel resolution (the U and V channels have a size that is a quarter of the Y channel, due to the width and height being halved). Such subsampling can cause the input data to be incompatible with the input of the E2E-NNVC system. The input data is the information that the E2E-NNVC system is attempting to encode and/or decode (e.g., a YUV frame that includes three channels, including the luminance (Y) and chrominance (U and V) channels). Many neural network-based systems assume all channel dimensions of the input data are the same, and thus feed all of the input channels to the same network. In such cases, the outputs of certain operations can be added (e.g., using matrix addition), in which case the dimensions of the channels have to be the same.

In some examples, to address such issues, the Y channel can be subsampled into four half resolution Y channels. The four half resolution Y channels can be combined with the two chrominance channels, resulting in six input channels. The six input channels can be input or fed into a E2E-NNVC system designed for RGB inputs. Such an approach may address the issue with respect to resolution differences of the luminance (Y) and chrominance (U and V) channels. However, the inherent differences between the luminance (Y) and chrominance (U and V) channels still exists, resulting in poor coding (e.g., encoding and/or decoding) performance.

As noted above, systems and techniques are described herein for performing image and/or video coding using one or more ML-based systems. The systems and techniques described herein provide a front-end architecture (e.g., a new subnetwork, such as in an end-to-end neural network-based image and video coding (E2E-NNVC) system) designed for processing input data that has luminance-chrominance (YUV) input formats (e.g., YUV420, YUV444, YUV422, among others). In some examples, the front-end architecture is configured to accommodate the YUV 4:2:0 input format in E2E-NNVCs designed for RGB input format. As noted above, the front-end architecture is applicable to many E2E-NNVC architectures (e.g., including the architectures described in the J. Balle Paper and in the D. Minnen Paper). The systems and techniques described herein considers the different characteristics of the luminance (Y) and chrominance (U and V) channels, as well as the difference in resolutions of the luminance (Y) and chrominance (U and V) channels. The E2E-NNVC system can encode and/or decode stand-alone frames (or images) and/or video data that includes multiple frames.

In some examples, the systems and techniques described herein can input or feed the Y and UV channels into two separated layers initially. The E2E-NNVC system can then combine data associated with the Y and UV channels after a certain number of layers (e.g., after a first pair of convolutional and non-linear layers or other layers, as shown in FIG. 6A-FIG. 6E which are described below). Because the U and V chroma components are subsampled with respect to the luminance (Y) channel, the subsampling in the first convolutional layer can be skipped and convolutional (e.g., CNN) kernels of a particular size (e.g., having a size of (N/2+1)×(N/2+1)) can be used for the subsampled input chrominance (U and V) channels. CNN kernels having a different size (e.g., N×N CNN kernels) as compared to the kernel used for the chrominance (U and V) channels can then be used for the luminance (Y) channel. The two branches (carrying luma and chroma channel or component information separately) of the front-end architecture can be combined using a convolutional layer (e.g., a 1×1 convolutional layer) that combines values across the channels. The use of a 1×1 convolution layer can provide various benefits as described herein, including increasing coding efficiency.

FIG. 6A-FIG. 6F illustrate illustrative examples of front-end architectures of a neural network system. In some examples, the front-end architectures of FIG. 6A-FIG. 6F can be part of an E2E-NNVC system designed for processing (encoding and/or decoding) data having a YUV 4:2:0 format. For instance, the front-end architectures can be configured for processing input data having a YUV 4:2:0 format. The front-end architectures of FIG. 6A, FIG. 6C, FIG. 6D, and FIG. 6E have two different nonlinear operators applied after a 1×1 convolutional layer. For instance, a generalized divisive normalization (GDN) operator is used in the architecture of FIG. 6A, while a parametric rectified linear unit (PReLU) nonlinear operator is applied in the architecture of FIG. 6C-FIG. 6E. In some examples, a similar neural network architecture as that shown in FIG. 6A and FIG. 6C-FIG. 6F can be used for encoding and/or decoding other types of YUV content (e.g., content having a YUV 4:4:4 format, a YUV 4:2:2 format, etc.) and/or content having other input formats.

Figure 6A:
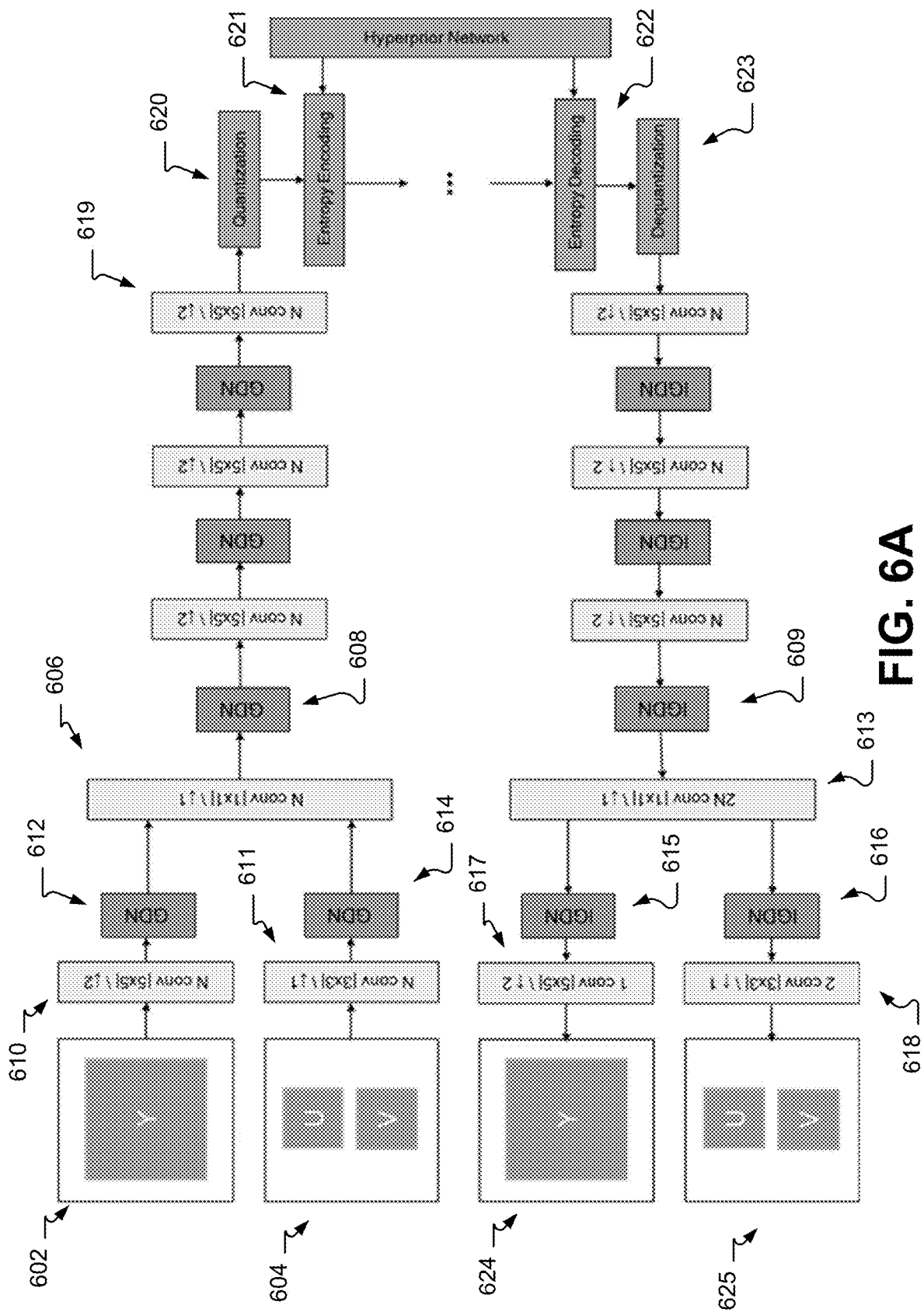
FIG. 6A is a diagram illustrating an example of a front-end neural network architecture that can be part of an end-to-end neural network based image and video coding system, in accordance with some examples.

For example, FIG. 6A is a diagram illustrating an example of a front-end neural network system or architecture that can be configured to work directly with 4:2:0 input (Y, U and V) data. As shown in FIG. 6A, at an encoder sub-network of the neural network system, branched luma and chroma channels (luma (Y) channel 602 and chroma (U and V) channels 604) are combined using a 1×1 convolutional layer 606 and then a GDN nonlinear operator 608 is applied. Similar operations are performed on a decoder sub-network of the neural network system, but in reverse order. For instance, as shown in FIG. 6A, an inverse GDN (IGDN) operator 609 is applied, the Y and U, V channels are separated using a 1×1 convolutional layer 613, and the separate Y and U, V channels are processed using respective IGDNs 615, 616 and convolutional layers 617, 618.

For example, the first two neural network layers in the encoder sub-network of the neural network system of FIG. 6A include a first convolutional layer 611 (denoted Nconv |3×3|↓1), a second convolutional layer 610 (denoted Nconv |5×5|↓2), a first GDN layer 614, and a second GDN layer 612. The last two neural network layers in the decoder sub-network of the front-end neural network architecture of FIG. 6A include a first inverse-GDN (IGDN) layer 616, a second inverse-GDN (IGDN) 615, a first convolutional layer 618 (denoted 2conv |3×3|↑1) for generating the reconstructed chrominance (U and V) components of a frame, and a second convolutional layer 617 (denoted 1conv |5×5|↑2) for generating the reconstructed luminance (Y) component of the frame. The "Nconv" notation refers to a number (N) of output channels (corresponding to a number of output features) of a given convolutional layer (with the value of N defining the number of output channels). The 3×3 and 5×5 notation indicates the size of the respective convolutional kernels (e.g., a 3×3 kernel and a 5×5 kernel). The "↓1" and "↓2" notation refers to stride values, where ↓1 refers to a stride of 1 (for downsampling as indicated by the "↓") and ↓2 refers to a stride of 1 (for downsampling). The "↑1" and "↑2" notation refers to refers to stride values, where ↑1 refers to a stride of 1 (for upsampling as indicated by the "↑") and ↑2 refers to a stride of 1 (for upsampling).

For example, the convolutional layer 610 downsamples the input luma channel 602 by a factor of four by applying a 5×5 convolutional filter in the horizontal and vertical dimensions by a stride value of 2. The resulting output of the convolutional layer 610 is N arrays (corresponding to the N channels) of feature values. The convolutional layer 611 processes the input chroma (U and V) channel 604 by applying a 3×3 convolutional filter in the horizontal and vertical dimensions by a stride value of 1. The resulting output of the convolutional layer 611 is N arrays (corresponding to the N channels) of feature values. The arrays of feature values output by the convolutional layer 610 have a same dimension as the arrays of feature values output by the convolutional layer 611. The GDN layer 612 can then process the feature values output by the convolutional layer 610 and the GDN layer 614 can process the feature values output by the convolutional layer 611.

The 1×1 convolutional layer 606 can then process the feature values output by the GDN layers 612, 614. The 1×1 convolutional layer 606 can generate a linear combination of the features associated with the luma channel 602 and the chroma channels 604. The linear combination operation operates as a per-value cross-channel mixing of the Y and UV components, resulting in a cross-component (e.g., cross-luminance and chrominance component) prediction that enhances coding performance. Each 1×1 convolutional filter of the 1×1 convolutional layer 606 can include a respective scaling factor that is applied to a corresponding Nth channel of the luma channel 602 and a corresponding Nth channel of the chroma channels 604.

Figure 6B:
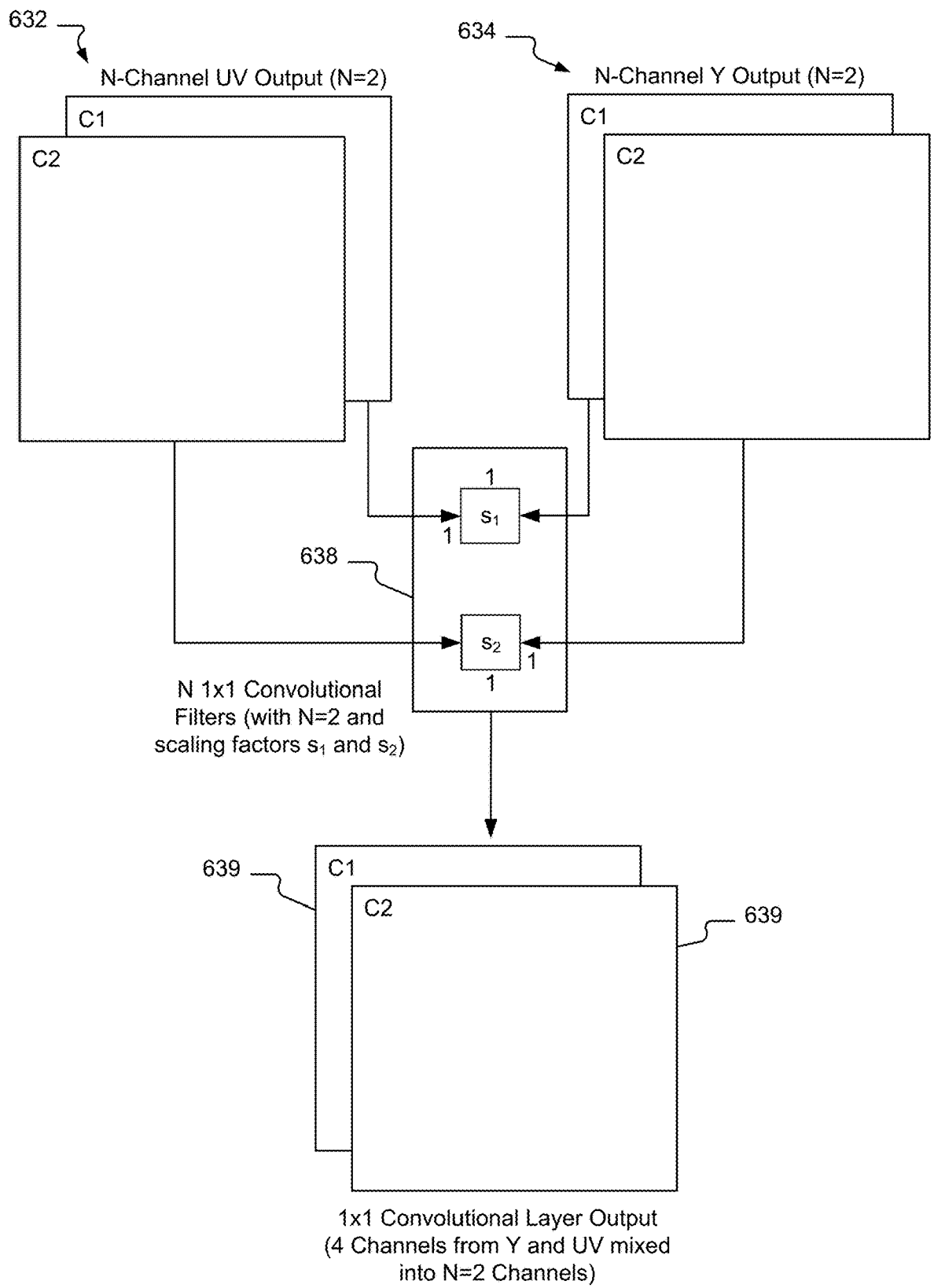
FIG. 6B is a diagram illustrating an example operation of a 1×1 convolutional layer, in accordance with some examples.

FIG. 6B is a diagram illustrating an example operation of a 1×1 convolutional layer 638. As noted above, N represents the number of output channels. As shown in FIG. 6B, 2N channels are provided as input to the 1×1 convolutional layer 638, including an N-channel chroma (combined U and V) output 632 and an N-channel luma (Y) output 634. In the example of FIG. 6B, the value of N is equal to 2, indicating two channels of values for the N-channel chroma output 632 and two channels of values for the N-channel luma output 634. Referring to FIG. 6A, the N-channel chroma output 632 can be the output from the GDN layer 614, and the N-channel luma output 634 can be the output from the GDN layer 612. However, in other examples, the N-channel chroma output 632 and the N-channel luma output 634 can be output from other non-linear layers (e.g., from the pReLU layers 652 and 654, respectively, of FIG. 6D, from the pReLU layers 662 and 664, respectively, of FIG. 6E) or directly from the convolutional layers (e.g., output from the convolutional layers 670 and 671, respectively, of FIG. 6F).

The 1×1 convolutional layer 638 processes the 2N channels and performs a feature-wise linear combination of the 2N channels, and then outputs an N-channel set of features or coefficients. The 1×1 convolutional layer 638 includes two 1×1 convolutional filters (based on N=2). The first 1×1 convolutional filter is shown with an $s_1$ value and the second 1×1 convolutional filter is shown with an 52 value. The $s_1$ value represents a first scaling factor and the $s_2$ value represents a second scaling factor. In one illustrative example, the $s_1$ value is equal to 3 and the $s_2$ value is equal to 4. Each of the 1×1 convolutional filters of the 1×1 convolutional layer 638 has a stride value of 1, indicating that the scaling factors $s_1$ and $s_2$ will be applied to each value in the UV output 632 and the Y output 634.

For example, the scaling factor $s_1$ of the first 1×1 convolutional filter is applied to each value in the first channel (C1) of the UV output 632 and to each value in the first channel (C1) of the Y output 634. Once each value of the first channel (C1) of the UV output 632 and each value of the first channel (C1) of the Y output 634 are scaled by the scaling factor $s_1$ of the first 1×1 convolutional filter, the scaled values are combined into a first channel (C1) of output values 639. The scaling factor $s_2$ of the second 1×1 convolutional filter is applied to each value in the second channel (C2) of the UV output 632 and to each value in the second channel (C2) of the Y output 634. After each value of the second channel (C2) of the UV output 632 and each value of the second channel (C2) of the Y output 634 are scaled by the scaling factor $s_2$ of the second 1×1 convolutional filter, the scaled values are combined into a second channel (C2) of output values 639. As a result, the four Y and UV channels (two Y channels and two combined UV channels) are mixed or combined into two output channels C1 and C2.

Returning to FIG. 6A, the output of the 1×1 convolutional layer 606 is processed by additional GDN layers and additional convolutional layers of the encoder sub-network. A quantization engine 620 can perform quantization on the features output by a final neural network layer 619 of the encoder sub-network to generate a quantized output. An entropy encoding engine 621 can entropy encode the quantized output from the quantization engine 620 to generate a bitstream. As shown in FIG. 6A, the entropy encoding engine 621 can use a prior generated by a hyperprior network to perform the entropy encoding. The neural network system can output the bitstream for storage, for transmission to another device, to a server device or system, and/or otherwise output the bitstream.

A decoder sub-network of the neural network system or a decoder sub-network of another neural network system (of another device) can decode the bitstream. For example, as shown in FIG. 6A, an entropy decoding engine 622 of the decoder sub-network can entropy decode the bitstream and output the entropy decoded data to a dequantization engine 623. The entropy decoding engine 622 can use a prior generated by a hyperprior network to perform the entropy decoding, as illustrated in FIG. 6A. The dequantization engine 623 can dequantize the data. The dequantized data can be processed by a number of convolutional layers and a number of inverse GDNs (IGDNs) of the decoder sub-network.

After being processed by an IGDN layer 609, the 1×1 convolutional layer 613 can process the data. The 1×1 convolutional layer 613 can include 2N convolutional filters, which can divide the data into Y channel features and combined UV channel features. For example, each of the N channels output by the IGDN layer 609 can be processed using 2N 1×1 convolutions (resulting in scaling) of the 1×1 convolutional layer 613. For each scaling factor $n_i$ corresponding to an output channel (from a total of 2N output channels) that is applied to the N input channels, the decoder sub-network can perform a summation across the N input channels, resulting in 2N outputs. In one illustrative example, for a scaling factor $n_1$, the decoder sub-network can apply the scaling factor $n_1$ to N input channels and can sum the result, which results in one output channel. The decoder sub-network can perform this operation for 2N different scaling factors (e.g., scaling factor $n_1$, scaling factor $n_2$, through scaling factor $n_{2N}$).

The Y channel features output by the 1×1 convolutional layer 613 can be processed by an IGDN 615. The combined UV channel features output by the 1×1 convolutional layer 613 can be processed by an IGDN 616. A convolutional layer 617 can process the Y channel features and output a reconstructed Y channel per pixel or sample of a reconstructed frame (e.g., luminance samples or pixels), shown as reconstructed Y component 624. A convolutional layer 618 can process the combined UV channel features, and can output a reconstructed U channel per pixel or sample of the reconstructed frame (e.g., chrominance-blue samples or pixels) and a reconstructed V channel per pixel or sample of the reconstructed frame (e.g., chrominance-red samples or pixels), shown as reconstructed U and V components 625.

Figure 6C:
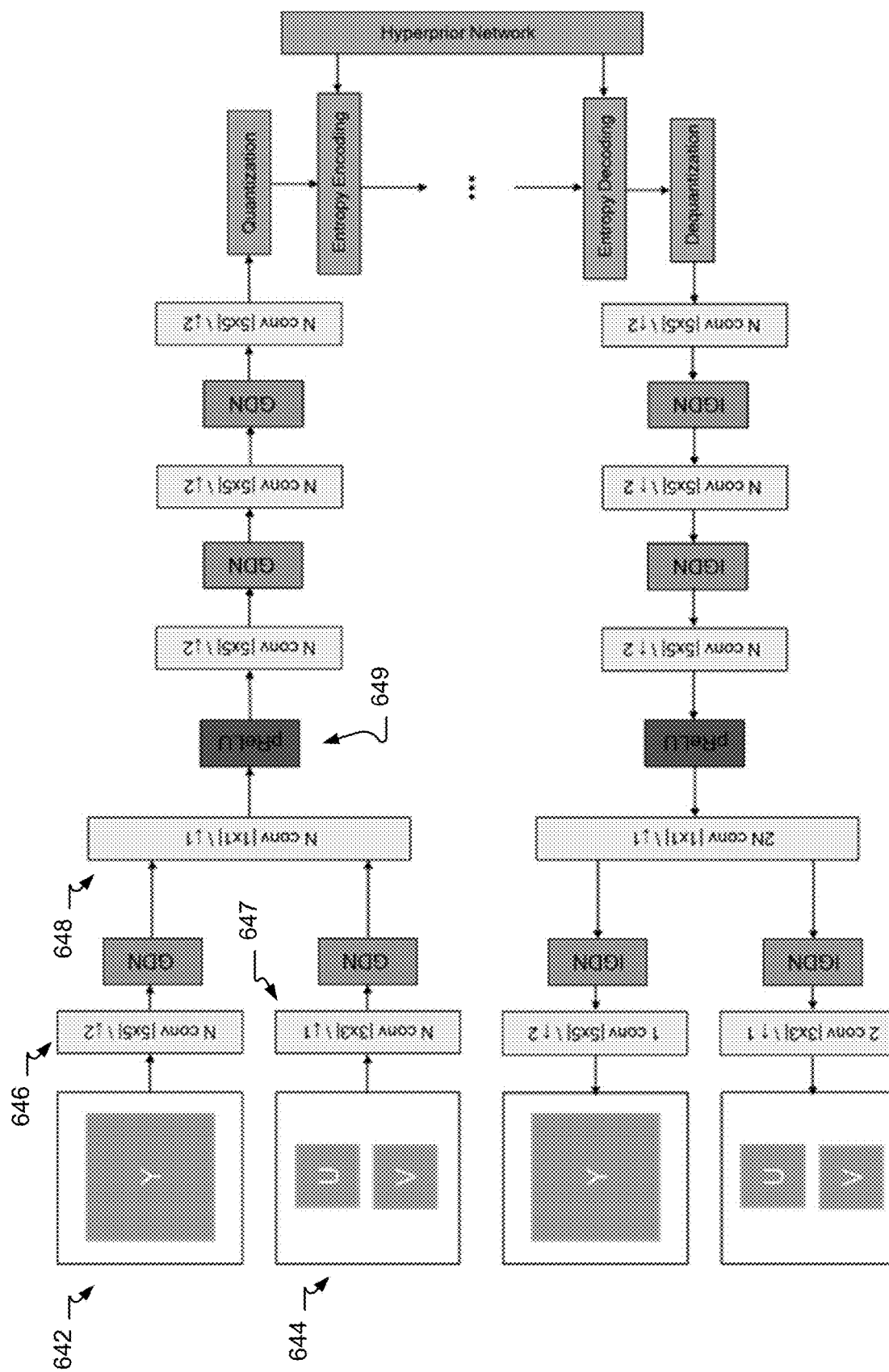
FIG. 6C is a diagram illustrating another example of a front-end neural network architecture that can be part of an end-to-end neural network based image and video coding system, in accordance with some examples.

FIG. 6C is a diagram illustrating another example of a front-end neural network system or architecture that can be configured to operate directly with 4:2:0 input (Y, U and V) input data. As shown in FIG. 6C, at an encoder sub-network of the neural network system, branched luma and chroma channels (luma channel 642 and chroma channels 644) are combined using a 1×1 convolutional layer 648 (similar to that described above with respect to the 1×1 convolutional layer 606 of FIG. 6A) and then a pReLU nonlinear operator 649 is applied. In other examples, nonlinear operators other than a pReLU nonlinear operator can be applied. Similar operations are performed by a decoder sub-network of the neural network system of FIG. 6C (similar to that described above with respect to FIG. 6A), but in reverse order (e.g., a pReLU operator is applied, the Y and U, V channels are separated using a 1×1 convolutional layer, and the separate Y and U, V channels are processed using respective inverse IGDNs and convolutional layers).

As compared to the E2E-NNVC system (neural network based codec) described in FIG. 5, the input processing of the front-end architectures of FIG. 6A and FIG. 6C is modified by separate handling of Y and UV channels in the first two network layers in $g_a$ (on the encoder side) and corresponding $g_s$ (on the decoder side). The first convolutional layer (e.g., convolutional layer 610 in FIG. 6A and convolutional layer 646 in FIG. 6C), denoted Nconv |5×5|↓2, used to process the Y component can be the same or similar as the first convolutional layer 510 in FIG. 5. Similarly, the second convolutional layer (denoted 1conv |5×5|↑2) of the decoder sub-network of FIG. 6A and FIG. 6C used to generate the reconstructed luminance (Y) component can be the same or similar as the last convolutional layer of the decoder sub-network $g_s$ in the system of FIG. 5. Unlike the system of FIG. 5, the U and V chroma channels are processed by the architectures of FIG. 6A and FIG. 6C using a separate convolutional layer (e.g., a separate CNN, such as convolutional layer 611 in FIG. 6A or convolutional layer 647 in FIG. 6C), denoted Nconv |3×3|↓1, with a kernel that has half the size (and without downsampling, corresponding to a stride equal to 1) of the Y kernel of the Nconv |5×5|↓2 convolutional layer 610 in FIG. 6A or the Nconv |5×5|↓2 convolutional layer 646 in FIG. 6C, followed by a particular GDN layer (one GDN layer for the luminance Y and one GDN layer for the chrominance U and V).

After the convolutional layers (the first pair of CNNs Nconv |5×5|↓2 and Nconv |3×3|↓1 layers) and the GDN layers of FIG. 6A and FIG. 6C, the representation or features of the luminance (Y) channel and chrominance (U and V) channels (e.g., a transformed or filtered version of the input channels) have same dimension, and are then combined using the 1×1 convolution layer 606 of FIG. 6A or the 1×1 convolution layer 648 of FIG. 6C. For example, the luminance (Y) channel is twice the size in each dimension as the chrominance (U and V) channels in the YUV 4:2:0 format. When the chrominance (U and V) channels are subsampled by 2, the output generated based on processing those channels becomes the same dimension as the conv2d output of the luminance channel (because the luminance channel is not subsampled). The separate normalization of channels addresses the difference in variance of the luminance and chrominance channels. As noted above, a nonlinear operator can then be applied (e.g., using the GDN 608 or the pReLU 649) before using three more convolutional layers until reaching the quantization step.

In the decoder sub-networks of the architectures in FIG. 6A and FIG. 6C, separate IGDN and convolutional layers are used to separately generate the reconstructed luminance (Y) component and the reconstructed chrominance (U and V) components. For instance, the convolutional layer 618 (the 2conv |3×3|↑1 layer of the decoder sub-network) of FIG. 6A used to generate the reconstructed chrominance (U and V) components 625 has a kernel size that is approximately half the size (and without upsampling, corresponding to a stride equal to 1) of the kernel used in the convolutional layer 617 (the 1conv |5×5|↑2 layer of the decoder sub-network) used to generate the reconstructed luminance (Y) component 624.

Figure 6D:
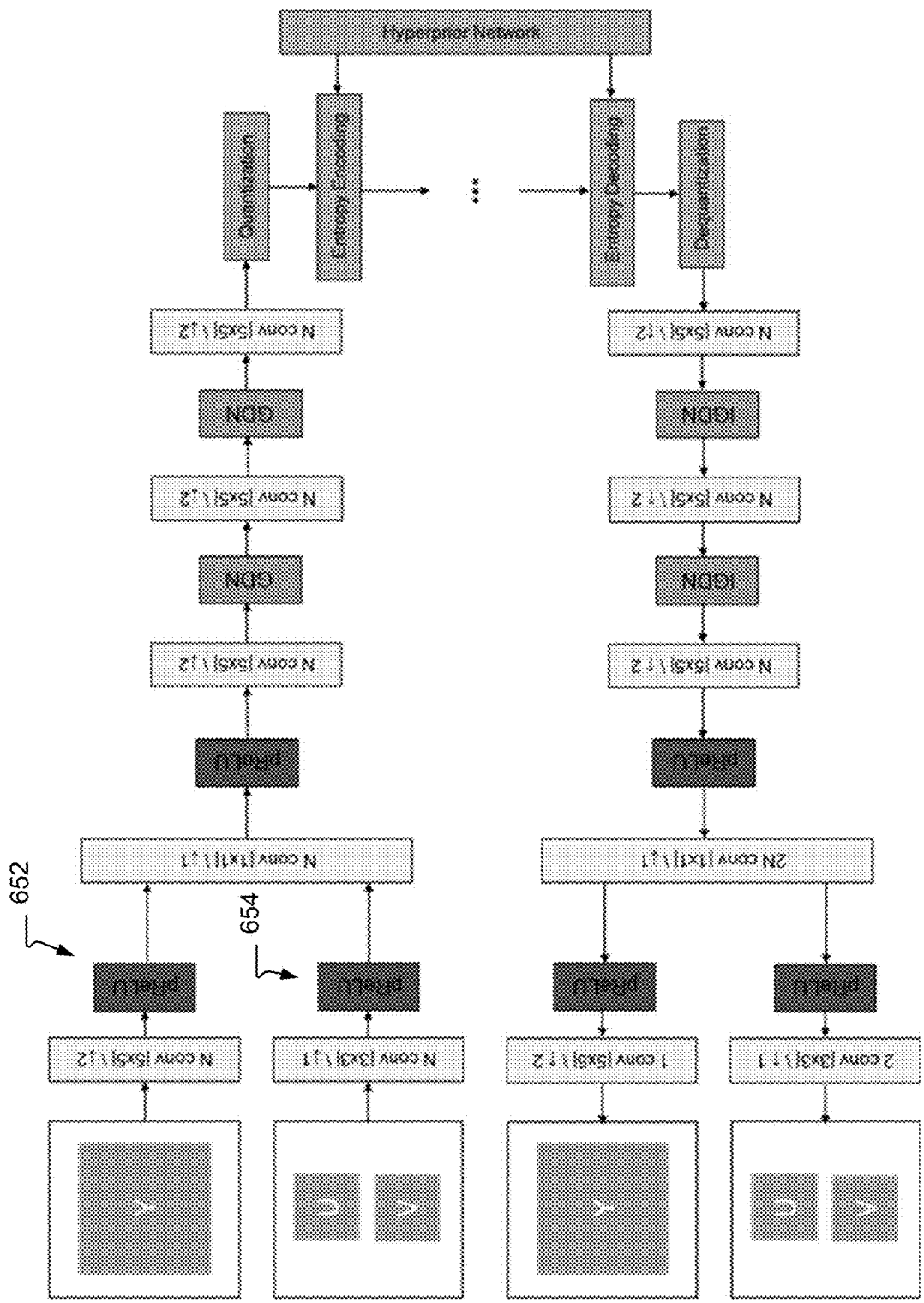
FIG. 6D is a diagram illustrating another example of a front-end neural network architecture that can be part of an end-to-end neural network based image and video coding system, in accordance with some examples.

FIG. 6D is a diagram illustrating another example of a front-end neural network architecture that can be configured to operate directly with 4:2:0 input (Y, U and V) input data. As shown in FIG. 6D, at the encoder side, the branched luma and chroma channels are combined using a 1×1 convolutional layer and then a pReLU nonlinear operator is applied. As compared to the architectures shown in FIG. 6A and FIG. 6C, the GDN layers in the luma and chroma branches are replaced with a PReLU operator.

Figure 6E:
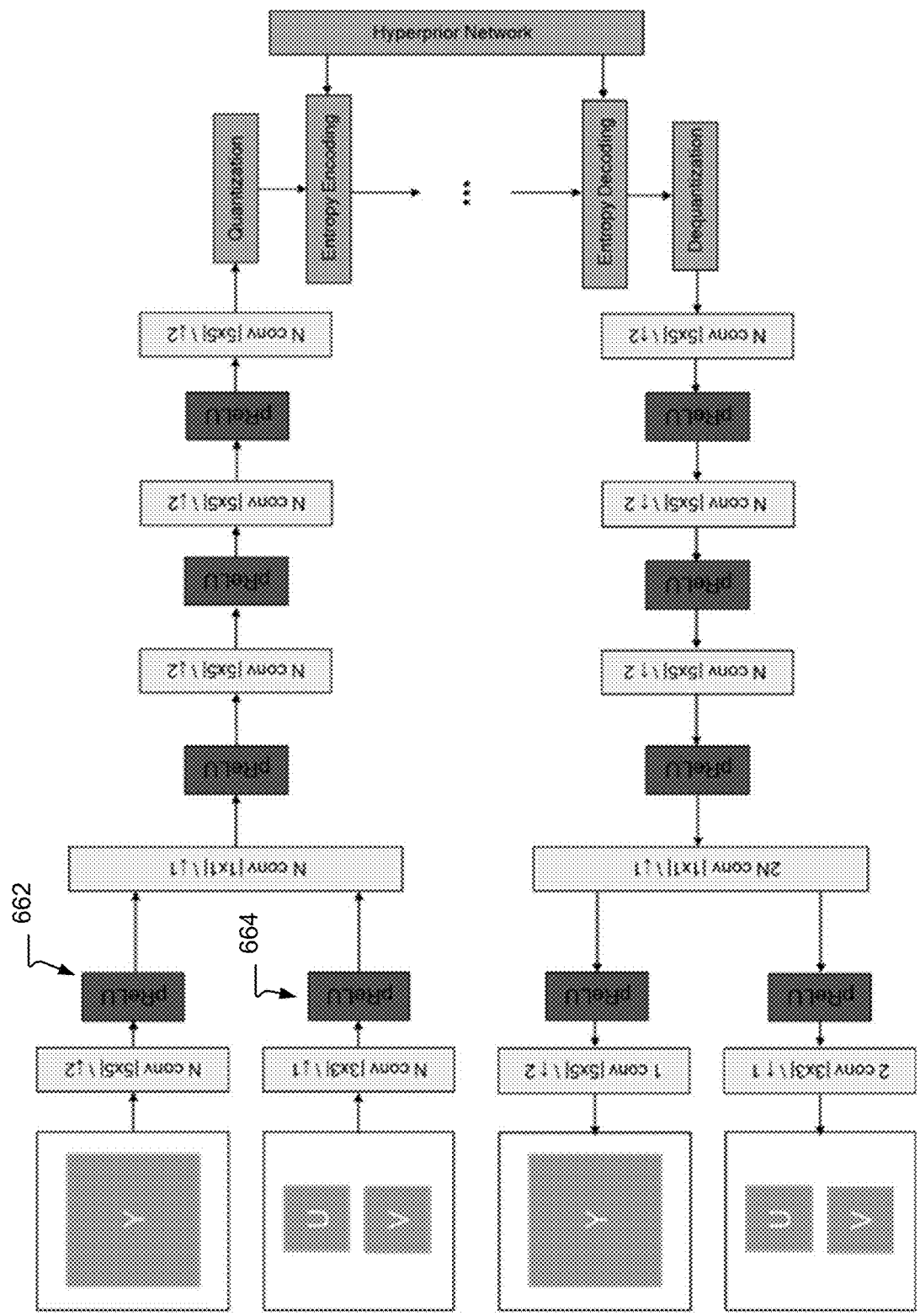
FIG. 6E is a diagram illustrating another example of a front-end neural network architecture that can be part of an end-to-end neural network based image and video coding system, in accordance with some examples.
Figure 6F:
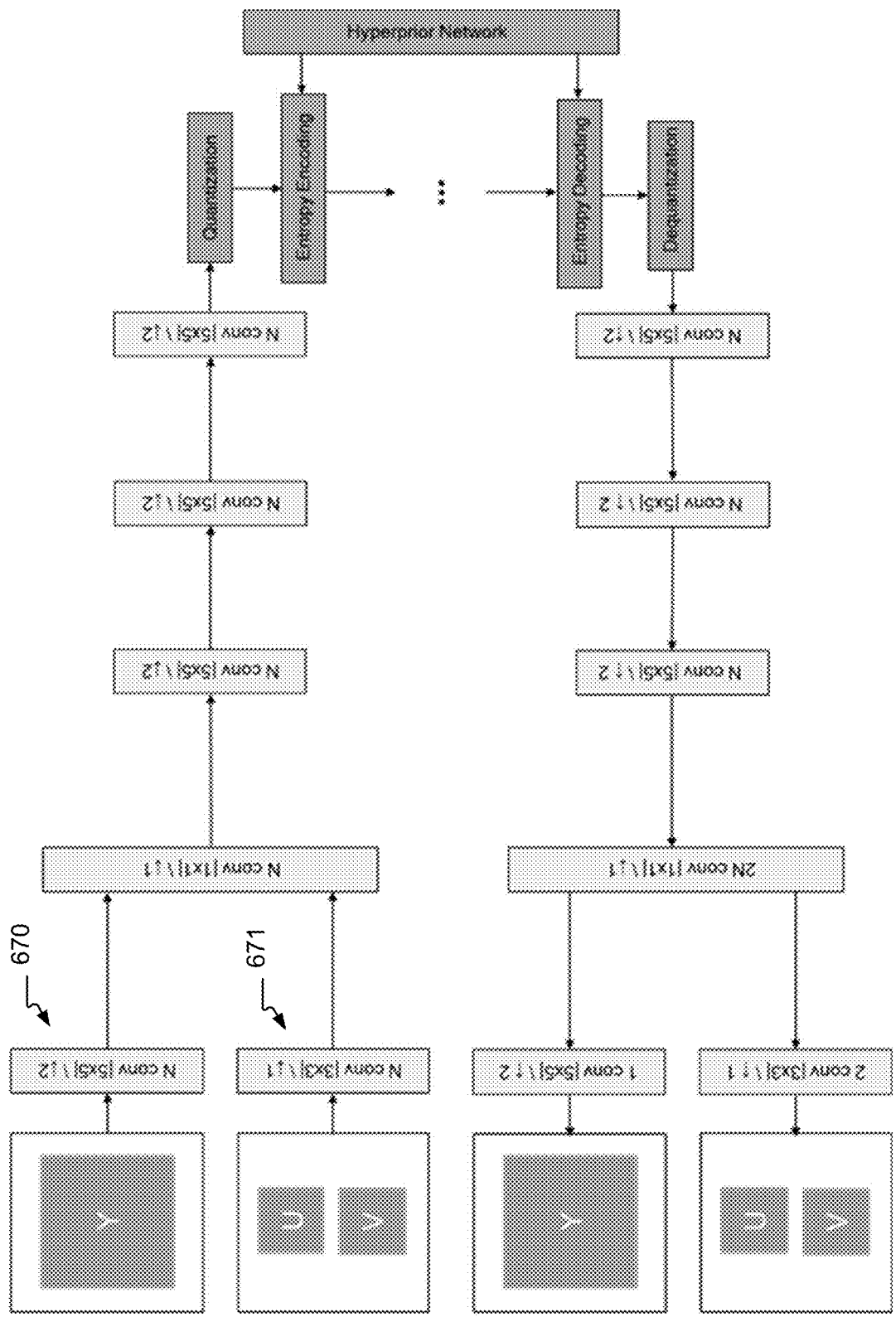
FIG. 6F is a diagram illustrating another example of a front-end neural network architecture that can be part of an end-to-end neural network based image and video coding system, in accordance with some examples.

FIG. 6E is a diagram illustrating another example of a front-end neural network architecture that can be configured to operate directly with 4:2:0 input (Y, U and V) input data. As shown in FIG. 6E, at the encoder side, the branched luma and chroma channels are combined using a 1×1 convolutional layer and then a pReLU nonlinear operator is applied. As compared to the architectures shown in FIG. 6A, FIG. 6C, and FIG. 6D, all of the GDN layers of the architecture in FIG. 6E are replaced with a PReLU operator FIG. 6F is a diagram illustrating another example of a front-end neural network architecture that can be configured to operate directly with 4:2:0 input (Y, U and V) input data. As shown in FIG. 6F, at the encoder side, branched luma and chroma channels are combined using 1×1 convolutional layer. As compared to the architectures shown in FIG. 6A-FIG. 6E, all of the GDN layers are removed completely, and no nonlinear activation operations are used between convolutional layers.

The neural network architecture designs illustrated in FIG. 6C-FIG. 6F can be used to reduce the GDN layers (e.g., as shown in the architecture of FIG. 6C) or completely removed the GDN layers (e.g., as shown in the architectures of FIG. 6E and FIG. 6F).

In some examples, the systems and techniques described herein can be used for other encoder-decoder sub-networks that use convolutional (e.g., CNN) and normalization stage combinations at the input of the neural network based coding system.

Figure 7:
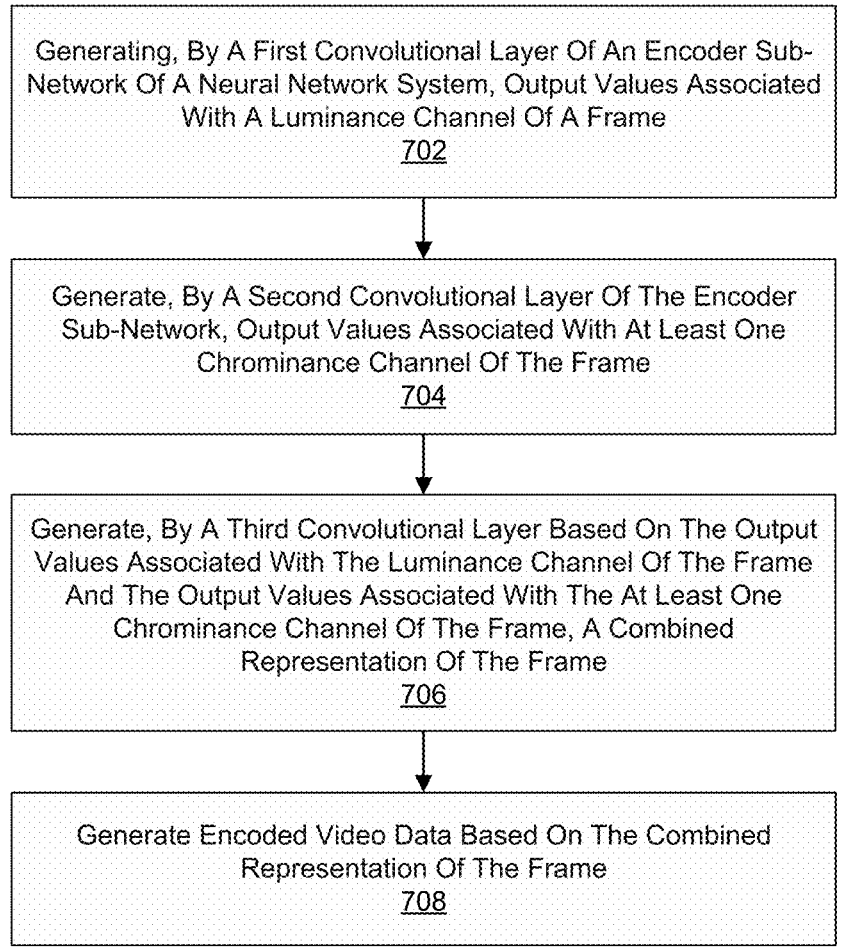
FIG. 7 is a flowchart illustrating an example of a process for processing video data, in accordance with some examples.

FIG. 7 is a flowchart illustrating an example of a process 700 of processing video using one or more of the machine learning techniques described herein. At block 702, the process 700 includes generating, by a first convolutional layer of an encoder sub-network of a neural network system, output values associated with a luminance channel of a frame.

At block 704, the process 700 includes generating, by a second convolutional layer of the encoder sub-network, output values associated with at least one chrominance channel of the frame. At block 706, the process 700 includes generating, by a third convolutional layer based on the output values associated with the luminance channel of the frame and the output values associated with the at least one chrominance channel of the frame, a combined representation of the frame. In some cases, the third convolutional layer includes a 1×1 convolutional layer (e.g., the 1×1 convolutional layer of the encoder sub-network of FIG. 6A-FIG. 6F) that includes one or more 1×1 convolutional filters. At block 708, the process 700 includes generating encoded video data based on the combined representation of the frame.

In some examples, the process 700 includes processing, using a first non-linear layer of the encoder sub-network, the output values associated with a luminance channel of the frame. The process 700 can include processing, using a second non-linear layer of the encoder sub-network, the output values associated with at least one chrominance channel of the frame. In such examples, the combined representation is generated based on an output of the first non-linear layer and an output of the second non-linear layer. In some cases, the combined representation of the frame is generated by the third convolutional layer (e.g., the 1×1 convolutional layer of the encoder sub-network of FIG. 6A-FIG. 6F) using the output of the first non-linear layer and the output of the second non-linear layer as input.

In some examples, the process 700 includes quantizing the encoded video data (e.g., using the quantization engine 620). In some examples, the process 700 includes entropy coding the encoded video data (e.g., using the entropy encoding engine 621). In some examples, the process 700 includes storing the encoded video data in memory. In some examples, the process 700 includes transmitting the encoded video data over a transmission medium to at least one device.

In some examples, the process 700 includes obtaining an encoded frame. The process 700 can include generating, by a first convolutional layer of a decoder sub-network of the neural network system, reconstructed output values associated with a luminance channel of the encoded frame. The process 700 can further include generating, by a second convolutional layer of the decoder sub-network, reconstructed output values associated with at least one chrominance channel of the encoded frame. In some examples, the process 700 includes separating, using a third convolutional layer of the decoder sub-network, the luminance channel of the encoded frame from the at least one chrominance channel of the encoded frame. In some cases, the third convolutional layer of the decoder sub-network includes a 1×1 convolutional layer (e.g., the 1×1 convolutional layer of the decoder sub-network of FIG. 6A-FIG. 6F) that includes one or more 1×1 convolutional filters.

In some examples, the frame includes a video frame. In some examples, the at least one chrominance channel includes a chrominance-blue channel and a chrominance-red channel. In some examples, the frame has a luminance-chrominance (YUV) format.

Figure 8:
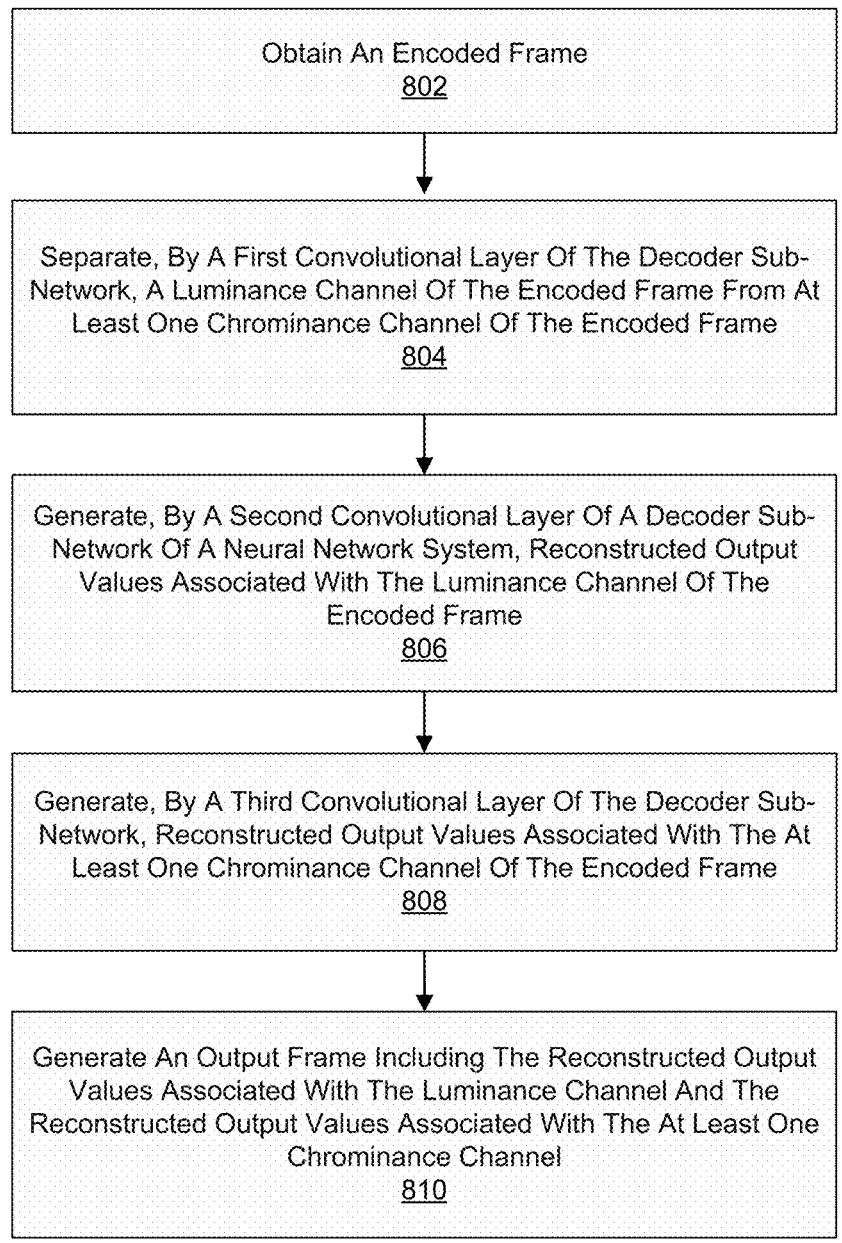
FIG. 8 is a flowchart illustrating another example of a process for processing video data, in accordance with some examples.

FIG. 8 is a flowchart illustrating an example of a process 800 of processing video using one or more of the machine learning techniques described herein. At block 802, the process 800 includes obtaining an encoded frame. At block 804, the process 800 includes separating, by a first convolutional layer of the decoder sub-network, a luminance channel of the encoded frame from at least one chrominance channel of the encoded frame. In some cases, the first convolutional layer of the decoder sub-network includes a 1×1 convolutional layer (e.g., the 1×1 convolutional layer of the decoder sub-network of FIG. 6A-FIG. 6F) that includes one or more 1×1 convolutional filters. At block 806, the process 800 includes generating, by a second convolutional layer of a decoder sub-network of a neural network system, reconstructed output values associated with a luminance channel of the encoded frame. At block 808, the process 800 includes generating, by a third convolutional layer of the decoder sub-network, reconstructed output values associated with at least one chrominance channel of the encoded frame. At block 810, the process 800 includes generating an output frame including the reconstructed output values associated with the luminance channel and the reconstructed output values associated with the at least one chrominance channel.

In some examples, the process 800 includes processing, using a first non-linear layer of the decoder sub-network, values associated with the luminance channel of the encoded frame. The reconstructed output values associated with the luminance channel are generated based on an output of the first non-linear layer. The process 700 can include processing, using a second non-linear layer of the decoder sub-network, values associated with the at least one chrominance channel of the encoded frame. The reconstructed output values associated with the at least one chrominance channel are generated based on an output of the second non-linear layer.

In some examples, process 800 includes dequantizing samples of the encoded frame (e.g., by the dequantization engine 623). In some examples, process 800 includes entropy decoding samples of the encoded frame (e.g., by the entropy decoding engine 622). In some examples, process 800 includes storing the output frame in memory. In some examples, the process 800 includes displaying the output frame.

In some examples, the process 800 includes generating, by a first convolutional layer of an encoder sub-network of the neural network system, output values associated with a luminance channel of a frame. The process 700 can include generating, by a second convolutional layer of the encoder sub-network, output values associated with at least one chrominance channel of the frame. The process 700 can further include generating, by a third convolutional layer of the encoder sub-network based on the output values associated with the luminance channel of the frame and the output values associated with the at least one chrominance channel of the frame, a combined representation of the frame. The process 700 can include generating the encoded frame based on the combined representation of the frame. In some cases, the third convolutional layer of the encoder sub-network includes a 1×1 convolutional layer, the 1×1 convolutional layer (e.g., the 1×1 convolutional layer of the encoder sub-network of FIG. 6A-FIG. 6F) including one or more 1×1 convolutional filters.

In some examples, the process 800 includes processing, using a first non-linear layer of the encoder sub-network, the output values associated with the luminance channel of the frame and processing, using a second non-linear layer of the encoder sub-network, the output values associated with at least one chrominance channel of the frame. In such examples, the combined representation is generated based on an output of the first non-linear layer and an output of the second non-linear layer. In some examples, the combined representation of the frame is generated by the third convolutional layer of the encoder sub-network using the output of the first non-linear layer and the output of the second non-linear layer as input.

In some examples, the encoded frame includes an encoded video frame. In some examples, the at least one chrominance channel includes a chrominance-blue channel and a chrominance-red channel. In some examples, the encoded frame has a luminance-chrominance (YUV) format.

Figure 9:
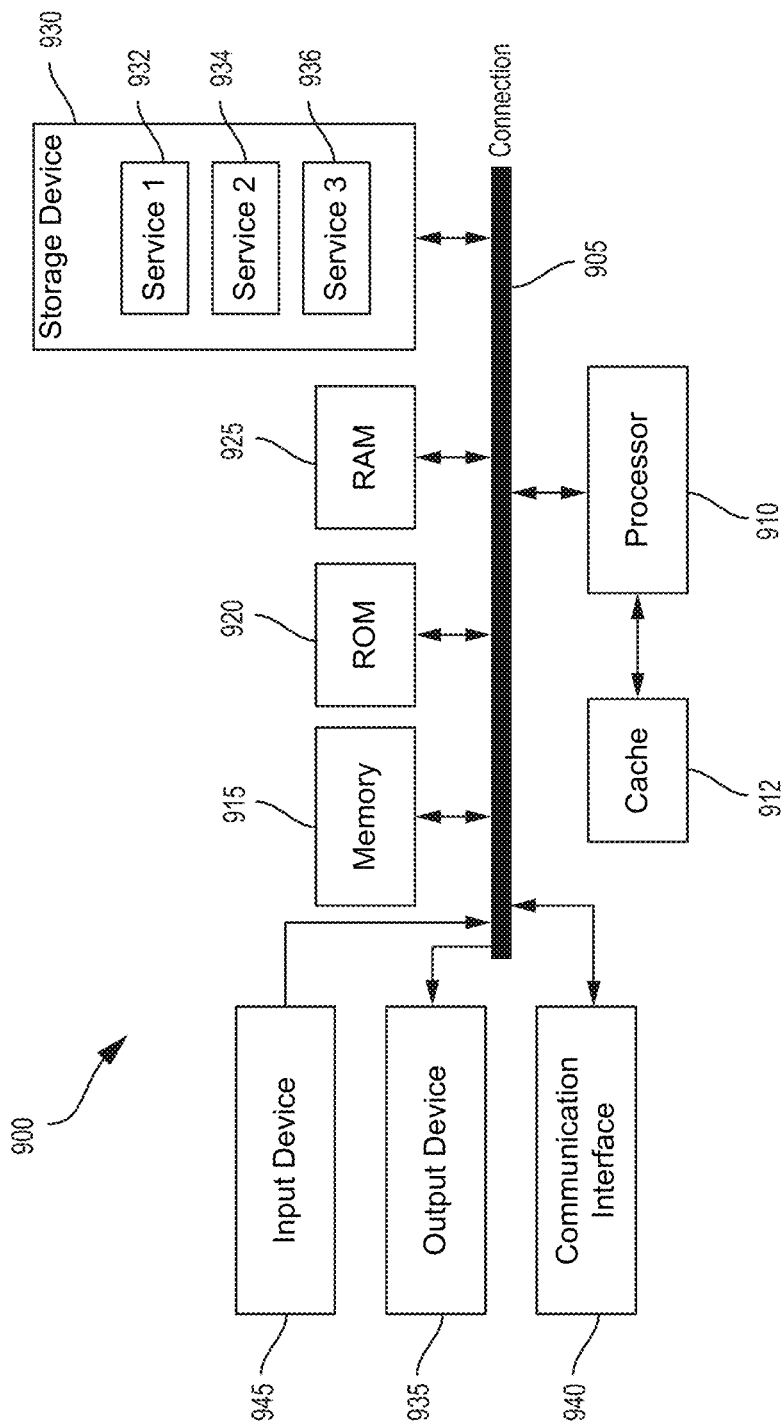
FIG. 9 illustrates an example computing device architecture of an example computing device which can implement the various techniques described herein.

In some examples, the processes described herein (e.g., process 700, process 800, and/or other process described herein) may be performed by a computing device or apparatus, such as a computing device having the computing device architecture 900 shown in FIG. 9. In one example, the process 700 and/or the process 800 can be performed by a computing device with the computing device architecture 900 implementing one of the neural network architectures shown in FIG. 6A-FIG. 6F. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 700 and/or process 800.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The processes 700 and 800 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 700, process 800, and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 900 can implement the system of FIG. 6. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method of processing video data, the method comprising: generating, by a first convolutional layer of an encoder sub-network of a neural network system, output values associated with a luminance channel of a frame;

generating, by a second convolutional layer of the encoder sub-network, output values associated with at least one chrominance channel of the frame; generating, by a third convolutional layer based on the output values associated with the luminance channel of the frame and the output values associated with the at least one chrominance channel of the frame, a combined representation of the frame; and generating encoded video data based on the combined representation of the frame.

Aspect 2: The method of aspect 1, wherein the third convolutional layer includes a 1×1 convolutional layer, the 1×1 convolutional layer including one or more 1×1 convolutional filters.

Aspect 3: The method of any one of aspects 1 or 2, further comprising: processing, using a first non-linear layer of the encoder sub-network, the output values associated with the luminance channel of the frame; and processing, using a second non-linear layer of the encoder sub-network, the output values associated with the at least one chrominance channel of the frame; wherein the combined representation is generated based on an output of the first non-linear layer and an output of the second non-linear layer.

Aspect 4: The method of aspect 3, wherein the combined representation of the frame is generated by the third convolutional layer using the output of the first non-linear layer and the output of the second non-linear layer as input.

Aspect 5: The method of any one of aspects 1 to 4, further comprising: quantizing the encoded video data.

Aspect 6: The method of any one of aspects 1 to 5, further comprising: entropy coding the encoded video data.

Aspect 7: The method of any one of aspects 1 to 6, further comprising: storing the encoded video data in memory.

Aspect 8: The method of any one of aspects 1 to 7, further comprising: transmitting the encoded video data over a transmission medium to at least one device.

Aspect 9: The method of any one of aspects 1 to 8, further comprising: obtaining an encoded frame; generating, by a first convolutional layer of a decoder sub-network of the neural network system, reconstructed output values associated with a luminance channel of the encoded frame; and generating, by a second convolutional layer of the decoder sub-network, reconstructed output values associated with at least one chrominance channel of the encoded frame.

Aspect 10: The method of aspect 9, further comprising: separating, using a third convolutional layer of the decoder sub-network, the luminance channel of the encoded frame from the at least one chrominance channel of the encoded frame.

Aspect 11: The method of aspect 10, wherein the third convolutional layer of the decoder sub-network includes a 1×1 convolutional layer, the 1×1 convolutional layer including one or more 1×1 convolutional filters.

Aspect 12: The method of any one of aspects 1 to 11, wherein the frame includes a video frame.

Aspect 13: The method of any one of aspects 1 to 12, wherein the at least one chrominance channel includes a chrominance-blue channel and a chrominance-red channel.

Aspect 14: The method of any one of aspects 1 to 13, wherein the frame has a luminance-chrominance (YUV) format.

Aspect 15: An apparatus for processing video data. The apparatus comprises a memory and a processor coupled to the memory and configured to: generate, using a first convolutional layer of an encoder sub-network of a neural network system, output values associated with a luminance channel of a frame; generate, using a second convolutional layer of the encoder sub-network, output values associated with at least one chrominance channel of the frame; generate, using a third convolutional layer based on the output values associated with the luminance channel of the frame and the output values associated with the at least one chrominance channel of the frame, a combined representation of the frame; and generate encoded video data based on the combined representation of the frame.

Aspect 16: The apparatus of aspect 15, wherein the third convolutional layer includes a 1×1 convolutional layer, the 1×1 convolutional layer including one or more 1×1 convolutional filters.

Aspect 17: The apparatus of any one of aspects 15 or 16, wherein the processor is configured to: process, using a first non-linear layer of the encoder sub-network, the output values associated with the luminance channel of the frame; and process, using a second non-linear layer of the encoder sub-network, the output values associated with the at least one chrominance channel of the frame; wherein the combined representation is generated based on an output of the first non-linear layer and an output of the second non-linear layer.

Aspect 18: The apparatus of aspect 17, wherein the combined representation of the frame is generated by the third convolutional layer using the output of the first non-linear layer and the output of the second non-linear layer as input.

Aspect 19: The apparatus of any one of aspects 15 to 18, wherein the processor is configured to: quantize the encoded video data.

Aspect 20: The apparatus of any one of aspects 15 to 19, wherein the processor is configured to: entropy code the encoded video data.

Aspect 21: The apparatus of any one of aspects 15 to 20, wherein the processor is configured to: store the encoded video data in memory.

Aspect 22: The apparatus of any one of aspects 15 to 21, wherein the processor is configured to: transmit the encoded video data over a transmission medium to at least one device.

Aspect 23: The apparatus of any one of aspects 15 to 22, wherein the processor is configured to: obtain an encoded frame; generate, using a first convolutional layer of a decoder sub-network of the neural network system, reconstructed output values associated with a luminance channel of the encoded frame; and generate, using a second convolutional layer of the decoder sub-network, reconstructed output values associated with at least one chrominance channel of the encoded frame.

Aspect 24: The apparatus of aspect 23, wherein the processor is configured to:

separate, using a third convolutional layer of the decoder sub-network, the luminance channel of the encoded frame from the at least one chrominance channel of the encoded frame.

Aspect 25: The apparatus of aspect 24, wherein the third convolutional layer of the decoder sub-network includes a 1×1 convolutional layer, the 1×1 convolutional layer including one or more 1×1 convolutional filters.

Aspect 26: The apparatus of any one of aspects 15 to 25, wherein the frame includes a video frame.

Aspect 27: The apparatus of any one of aspects 15 to 26, wherein the at least one chrominance channel includes a chrominance-blue channel and a chrominance-red channel.

Aspect 28: The apparatus of any one of aspects 15 to 27, wherein the frame has a luminance-chrominance (YUV) format.

Aspect 29: The apparatus of any one of aspects 15 to 28, wherein the processor includes a neural processing unit (NPU).

Aspect 30: The apparatus of any one of aspects 15 to 29, wherein the apparatus comprises a mobile device.

Aspect 31: The apparatus of any one of aspects 15 to 30, wherein the apparatus comprises an extended reality device.

Aspect 32: The apparatus of any one of aspects 15 to 31, further comprising a display.

Aspect 33: The apparatus of any one of aspects 15 to 29, wherein the apparatus comprises television.

Aspect 34: The apparatus of any one of aspects 15 to 33, wherein the apparatus comprises camera configured to capture one or more video frames.

Aspect 35: A computer-readable storage medium storing instructions that, when executed, cause one or more processors to perform any of the operations of aspects 1 to 14.

Aspect 36: An apparatus comprising means for performing any of the operations of aspects 1 to 14.

Aspect 37: A method of processing video data, the method comprising: obtaining an encoded frame; separating, by a first convolutional layer of the decoder sub-network, a luminance channel of the encoded frame from at least one chrominance channel of the encoded frame; generating, by a second convolutional layer of a decoder sub-network of a neural network system, reconstructed output values associated with the luminance channel of the encoded frame; generating, by a third convolutional layer of the decoder sub-network, reconstructed output values associated with the at least one chrominance channel of the encoded frame; and generating an output frame including the reconstructed output values associated with the luminance channel and the reconstructed output values associated with the at least one chrominance channel.

Aspect 38: The method of aspect 37, wherein the first convolutional layer of the decoder sub-network includes a 1×1 convolutional layer, the 1×1 convolutional layer including one or more 1×1 convolutional filters.

Aspect 39: The method of any one of aspects 37 or 38, further comprising: processing, using a first non-linear layer of the decoder sub-network, values associated with the luminance channel of the encoded frame, wherein the reconstructed output values associated with the luminance channel are generated based on an output of the first non-linear layer; and processing, using a second non-linear layer of the decoder sub-network, values associated with the at least one chrominance channel of the encoded frame, wherein the reconstructed output values associated with the at least one chrominance channel are generated based on an output of the second non-linear layer.

Aspect 40: The method of any one of aspects 37 to 39, further comprising: dequantizing samples of the encoded frame.

Aspect 41: The method of any one of aspects 37 to 40, further comprising: entropy decoding samples of the encoded frame.

Aspect 42: The method of any one of aspects 37 to 41, further comprising: storing the output frame in memory.

Aspect 43: The method of any one of aspects 37 to 42, further comprising: displaying the output frame.

Aspect 44: The method of any one of aspects 37 to 43, further comprising: generating, by a first convolutional layer of an encoder sub-network of the neural network system, output values associated with a luminance channel of a frame; generating, by a second convolutional layer of the encoder sub-network, output values associated with at least one chrominance channel of the frame; generating, by a third convolutional layer of the encoder sub-network based on the output values associated with the luminance channel of the frame and the output values associated with the at least one chrominance channel of the frame, a combined representation of the frame; and generating the encoded frame based on the combined representation of the frame.

Aspect 45: The method of aspect 44, wherein the third convolutional layer of the encoder sub-network includes a 1×1 convolutional layer, the 1×1 convolutional layer including one or more 1×1 convolutional filters.

Aspect 46: The method of any one of aspects 44 or 45, further comprising: processing, using a first non-linear layer of the encoder sub-network, the output values associated with the luminance channel of the frame; and processing, using a second non-linear layer of the encoder sub-network, the output values associated with the at least one chrominance channel of the frame; wherein the combined representation is generated based on an output of the first non-linear layer and an output of the second non-linear layer.

Aspect 47: The method of aspect 46, wherein the combined representation of the frame is generated by the third convolutional layer of the encoder sub-network using the output of the first non-linear layer and the output of the second non-linear layer as input.

Aspect 48: The method of any one of aspects 37 to 47, wherein the encoded frame includes an encoded video frame.

Aspect 49: The method of any one of aspects 37 to 48, wherein the at least one chrominance channel includes a chrominance-blue channel and a chrominance-red channel.

Aspect 50: The method of any one of aspects 37 to 49, wherein the encoded frame has a luminance-chrominance (YUV) format.

Aspect 49: An apparatus for processing video data. The apparatus comprises a memory and a processor coupled to the memory and configured to: obtain an encoded frame; separate, using a first convolutional layer of the decoder sub-network, a luminance channel of the encoded frame from at least one chrominance channel of the encoded frame; generate, using a second convolutional layer of a decoder sub-network of a neural network system, reconstructed output values associated with the luminance channel of the encoded frame; generate, using a third convolutional layer of the decoder sub-network, reconstructed output values associated with the at least one chrominance channel of the encoded frame; and generate an output frame including the reconstructed output values associated with the luminance channel and the reconstructed output values associated with the at least one chrominance channel.

Aspect 50: The apparatus of aspect 49, wherein the first convolutional layer of the decoder sub-network includes a 1×1 convolutional layer, the 1×1 convolutional layer including one or more 1×1 convolutional filters.

Aspect 51: The apparatus of any one of aspects 49 or 50, wherein the processor is configured to: process, using a first non-linear layer of the decoder sub-network, values associated with the luminance channel of the encoded frame, wherein the reconstructed output values associated with the luminance channel are generated based on an output of the first non-linear layer; and process, using a second non-linear layer of the decoder sub-network, values associated with the at least one chrominance channel of the encoded frame, wherein the reconstructed output values associated with the at least one chrominance channel are generated based on an output of the second non-linear layer.

Aspect 52: The apparatus of any one of aspects 49 to 51, wherein the processor is configured to: dequantize samples of the encoded frame.

Aspect 53: The apparatus of any one of aspects 49 to 52, wherein the processor is configured to: entropy decode samples of the encoded frame.

Aspect 54: The apparatus of any one of aspects 49 to 53, wherein the processor is configured to: store the output frame in memory.

Aspect 55: The apparatus of any one of aspects 49 to 54, wherein the processor is configured to: display the output frame.

Aspect 56: The apparatus of any one of aspects 49 to 55, wherein the processor is configured to: generate, by a first convolutional layer of an encoder sub-network of the neural network system, output values associated with a luminance channel of a frame; generate, by a second convolutional layer of the encoder sub-network, output values associated with at least one chrominance channel of the frame; generate, by a third convolutional layer of the encoder sub-network based on the output values associated with the luminance channel of the frame and the output values associated with the at least one chrominance channel of the frame, a combined representation of the frame; and generate the encoded frame based on the combined representation of the frame.

Aspect 57: The apparatus of aspect 56, wherein the third convolutional layer of the encoder sub-network includes a 1×1 convolutional layer, the 1×1 convolutional layer including one or more 1×1 convolutional filters.

Aspect 58: The apparatus of any one of aspects 44 or 57, wherein the processor is configured to: process, using a first non-linear layer of the encoder sub-network, the output values associated with the luminance channel of the frame; and process, using a second non-linear layer of the encoder sub-network, the output values associated with the at least one chrominance channel of the frame; wherein the combined representation is generated based on an output of the first non-linear layer and an output of the second non-linear layer.

Aspect 59: The apparatus of aspect 58, wherein the combined representation of the frame is generated by the third convolutional layer of the encoder sub-network using the output of the first non-linear layer and the output of the second non-linear layer as input.

Aspect 60: The apparatus of any one of aspects 49 to 59, wherein the encoded frame includes an encoded video frame.

Aspect 61: The apparatus of any one of aspects 49 to 60, wherein the at least one chrominance channel includes a chrominance-blue channel and a chrominance-red channel.

Aspect 62: The apparatus of any one of aspects 49 to 61, wherein the encoded frame has a luminance-chrominance (YUV) format.

Aspect 63: The apparatus of any one of aspects 49 to 62, wherein the processor includes a neural processing unit (NPU).

Aspect 64: The apparatus of any one of aspects 49 to 63, wherein the apparatus comprises a mobile device.

Aspect 65: The apparatus of any one of aspects 49 to 64, wherein the apparatus comprises an extended reality device.

Aspect 66: The apparatus of any one of aspects 49 to 65, further comprising a display.

Aspect 67: The apparatus of any one of aspects 49 to 63, wherein the apparatus comprises television.

Aspect 68: The apparatus of any one of aspects 49 to 67, wherein the apparatus comprises camera configured to capture one or more video frames.

Aspect 69: A computer-readable storage medium storing instructions that, when executed, cause one or more processors to perform any of the operations of aspects 37 to 48.

Aspect 70: An apparatus comprising means for performing any of the operations of aspects 37 to 48.

What is claimed is:

1. A method of processing video data, the method comprising:
generating, by a first convolutional layer of an encoder sub-network of a neural network system, output values associated with a luminance channel of a frame;
generating, by a second convolutional layer of the encoder sub-network, output values associated with at least one chrominance channel of the frame;
generating, by a third convolutional layer based on the output values associated with the luminance channel of the frame and the output values associated with the at least one chrominance channel of the frame, a combined representation of the frame; and
generating encoded video data based on the combined representation of the frame.

2. The method of claim 1, wherein the third convolutional layer includes a 1×1 convolutional layer, the 1×1 convolutional layer including one or more 1×1 convolutional filters.

3. The method of claim 1, further comprising:
processing, using a first non-linear layer of the encoder sub-network, the output values associated with the luminance channel of the frame; and
processing, using a second non-linear layer of the encoder sub-network, the output values associated with the at least one chrominance channel of the frame;
wherein the combined representation is generated based on an output of the first non-linear layer and an output of the second non-linear layer.

4. The method of claim 3, wherein the combined representation of the frame is generated by the third convolutional layer using the output of the first non-linear layer and the output of the second non-linear layer as input.

5. The method of claim 1, further comprising:
quantizing the encoded video data.

6. The method of claim 1, further comprising:
entropy coding the encoded video data.

7. The method of claim 1, further comprising:
storing the encoded video data in memory.

8. The method of claim 1, further comprising:
transmitting the encoded video data over a transmission medium to at least one device.

9. The method of claim 1, further comprising:
obtaining an encoded frame;
generating, by a first convolutional layer of a decoder sub-network of the neural network system, reconstructed output values associated with a luminance channel of the encoded frame; and
generating, by a second convolutional layer of the decoder sub-network, reconstructed output values associated with at least one chrominance channel of the encoded frame.

10. The method of claim 9, further comprising:
separating, using a third convolutional layer of the decoder sub-network, the luminance channel of the encoded frame from the at least one chrominance channel of the encoded frame.

11. The method of claim 10, wherein the third convolutional layer of the decoder sub-network includes a 1×1 convolutional layer, the 1×1 convolutional layer including one or more 1×1 convolutional filters.

12. The method of claim 1, wherein the frame includes a video frame.

13. The method of claim 1, wherein the at least one chrominance channel includes a chrominance-blue channel and a chrominance-red channel.

14. The method of claim 1, wherein the frame has a luminance-chrominance (YUV) format.

15. An apparatus for processing video data, comprising:
a memory; and
a processor coupled to the memory and configured to:
generate, using a first convolutional layer of an encoder sub-network of a neural network system, output values associated with a luminance channel of a frame;
generate, using a second convolutional layer of the encoder sub-network, output values associated with at least one chrominance channel of the frame;
generate, using a third convolutional layer based on the output values associated with the luminance channel of the frame and the output values associated with the at least one chrominance channel of the frame, a combined representation of the frame; and
generate encoded video data based on the combined representation of the frame.

16. The apparatus of claim 15, wherein the third convolutional layer includes a 1×1 convolutional layer, the 1×1 convolutional layer including one or more 1×1 convolutional filters.

17. The apparatus of claim 15, wherein the processor is configured to:
process, using a first non-linear layer of the encoder sub-network, the output values associated with the luminance channel of the frame; and
process, using a second non-linear layer of the encoder sub-network, the output values associated with the at least one chrominance channel of the frame;
wherein the combined representation is generated based on an output of the first non-linear layer and an output of the second non-linear layer.

18. The apparatus of claim 17, wherein the combined representation of the frame is generated by the third convolutional layer using the output of the first non-linear layer and the output of the second non-linear layer as input.

19. The apparatus of claim 15, wherein the processor is configured to:
quantize the encoded video data.

20. The apparatus of claim 15, wherein the processor is configured to:
entropy code the encoded video data.

21. The apparatus of any one of claims 15, wherein the processor is configured to:
store the encoded video data in memory.

22. The apparatus of claim 15, wherein the processor is configured to:
transmit the encoded video data over a transmission medium to at least one device.

23. The apparatus of claim 15, wherein the processor is configured to:
obtain an encoded frame;
generate, using a first convolutional layer of a decoder sub-network of the neural network system, reconstructed output values associated with a luminance channel of the encoded frame; and
generate, using a second convolutional layer of the decoder sub-network, reconstructed output values associated with at least one chrominance channel of the encoded frame.

24. The apparatus of claim 23, wherein the processor is configured to:
separate, using a third convolutional layer of the decoder sub-network, the luminance channel of the encoded frame from the at least one chrominance channel of the encoded frame.

25. The apparatus of claim 24, wherein the third convolutional layer of the decoder sub-network includes a 1×1 convolutional layer, the 1×1 convolutional layer including one or more 1×1 convolutional filters.

26. The apparatus of claim 15, wherein the frame includes a video frame.

27. The apparatus of claim 15, wherein the at least one chrominance channel includes a chrominance-blue channel and a chrominance-red channel.

28. The apparatus of claim 15, wherein the frame has a luminance-chrominance (YUV) format.

29. The apparatus of claim 15, wherein the processor includes a neural processing unit (NPU).

30. The apparatus of claim 15, wherein the apparatus comprises a mobile device.

31. The apparatus of claim 15, further comprising at least one of a display and a camera configured to capture one or more frames.

32. A method of processing video data, the method comprising:
obtaining an encoded frame;
separating, by a first convolutional layer of a decoder sub-network, a luminance channel of the encoded frame from at least one chrominance channel of the encoded frame;
generating, by a second convolutional layer of the decoder sub-network of a neural network system, reconstructed output values associated with the luminance channel of the encoded frame;
generating, by a third convolutional layer of the decoder sub-network, reconstructed output values associated with the at least one chrominance channel of the encoded frame; and
generating an output frame including the reconstructed output values associated with the luminance channel and the reconstructed output values associated with the at least one chrominance channel.

33. The method of claim 32, wherein the first convolutional layer of the decoder sub-network includes a 1×1 convolutional layer, the 1×1 convolutional layer including one or more 1×1 convolutional filters.

34. The method of claim 32, further comprising:
processing, using a first non-linear layer of the decoder sub-network, values associated with the luminance channel of the encoded frame, wherein the reconstructed output values associated with the luminance channel are generated based on an output of the first non-linear layer; and
processing, using a second non-linear layer of the decoder sub-network, values associated with the at least one chrominance channel of the encoded frame, wherein the reconstructed output values associated with the at least one chrominance channel are generated based on an output of the second non-linear layer.

35. The method of claim 32, further comprising:
dequantizing samples of the encoded frame.

36. The method of claim 32, further comprising:
entropy decoding samples of the encoded frame.
37. The method of claim 32, further comprising:
storing the output frame in memory.
38. The method of claim 32, further comprising:
displaying the output frame.
39. The method of claim 32, further comprising:
generating, by a first convolutional layer of an encoder sub-network of the neural network system, output values associated with a luminance channel of a frame;
generating, by a second convolutional layer of the encoder sub-network, output values associated with at least one chrominance channel of the frame;
generating, by a third convolutional layer of the encoder sub-network based on the output values associated with the luminance channel of the frame and the output values associated with the at least one chrominance channel of the frame, a combined representation of the frame; and
generating the encoded frame based on the combined representation of the frame.
40. The method of claim 39, wherein the third convolutional layer of the encoder sub-network includes a 1×1 convolutional layer, the 1×1 convolutional layer including one or more 1×1 convolutional filters.
41. The method of claim 39, further comprising:
processing, using a first non-linear layer of the encoder sub-network, the output values associated with the luminance channel of the frame; and
processing, using a second non-linear layer of the encoder sub-network, the output values associated with the at least one chrominance channel of the frame;
wherein the combined representation is generated based on an output of the first non-linear layer and an output of the second non-linear layer.
42. The method of claim 41, wherein the combined representation of the frame is generated by the third convolutional layer of the encoder sub-network using the output of the first non-linear layer and the output of the second non-linear layer as input.
43. The method of claim 32, wherein the encoded frame includes an encoded video frame.
44. The method of claim 32, wherein the at least one chrominance channel includes a chrominance-blue channel and a chrominance-red channel.
45. The method of claim 32, wherein the encoded frame has a luminance-chrominance (YUV) format.
46. An apparatus for processing video data, comprising:
a memory; and
a processor coupled to the memory and configured to:
obtain an encoded frame;
separate, using a first convolutional layer of a decoder sub-network, a luminance channel of the encoded frame from at least one chrominance channel of the encoded frame;
generate, using a second convolutional layer of the decoder sub-network of a neural network system, reconstructed output values associated with the luminance channel of the encoded frame;
generate, using a third convolutional layer of the decoder sub-network, reconstructed output values associated with the at least one chrominance channel of the encoded frame; and
generate an output frame including the reconstructed output values associated with the luminance channel and the reconstructed output values associated with the at least one chrominance channel.

47. The apparatus of claim 46, wherein the first convolutional layer of the decoder sub-network includes a 1×1 convolutional layer, the 1×1 convolutional layer including one or more 1×1 convolutional filters.
48. The apparatus of claim 46, wherein the processor is configured to:
process, using a first non-linear layer of the decoder sub-network, values associated with the luminance channel of the encoded frame, wherein the reconstructed output values associated with the luminance channel are generated based on an output of the first non-linear layer; and
process, using a second non-linear layer of the decoder sub-network, values associated with the at least one chrominance channel of the encoded frame, wherein the reconstructed output values associated with the at least one chrominance channel are generated based on an output of the second non-linear layer.
49. The apparatus of claim 46, wherein the processor is configured to:
dequantize samples of the encoded frame.
50. The apparatus of claim 46, wherein the processor is configured to:
entropy decode samples of the encoded frame.
51. The apparatus of claim 46, wherein the processor is configured to:
store the output frame in memory.
52. The apparatus of claim 46, wherein the processor is configured to:
display the output frame.
53. The apparatus of claim 46, wherein the processor is configured to:
generate, by a first convolutional layer of an encoder sub-network of the neural network system, output values associated with a luminance channel of a frame;
generate, by a second convolutional layer of the encoder sub-network, output values associated with at least one chrominance channel of the frame;
generate, by a third convolutional layer of the encoder sub-network based on the output values associated with the luminance channel of the frame and the output values associated with the at least one chrominance channel of the frame, a combined representation of the frame; and
generate the encoded frame based on the combined representation of the frame.
54. The apparatus of claim 53, wherein the third convolutional layer of the encoder sub-network includes a 1×1 convolutional layer, the 1×1 convolutional layer including one or more 1×1 convolutional filters.
55. The apparatus of claim 53, wherein the processor is configured to:
process, using a first non-linear layer of the encoder sub-network, the output values associated with the luminance channel of the frame; and
process, using a second non-linear layer of the encoder sub-network, the output values associated with the at least one chrominance channel of the frame;
wherein the combined representation is generated based on an output of the first non-linear layer and an output of the second non-linear layer.
56. The apparatus of claim 55, wherein the combined representation of the frame is generated by the third convolutional layer of the encoder sub-network using the output of the first non-linear layer and the output of the second non-linear layer as input.

57. The apparatus of claim 46, wherein the encoded frame includes an encoded video frame.

58. The apparatus of claim 57, wherein the at least one chrominance channel includes a chrominance-blue channel and a chrominance-red channel.

59. The apparatus of claim 46, wherein the encoded frame has a luminance-chrominance (YUV) format.

60. The apparatus of claim 46, further comprising at least one of a display and a camera configured to capture one or more video frames.

* * * * *